United States Patent
Park et al.

(10) Patent No.: US 12,548,714 B2
(45) Date of Patent: Feb. 10, 2026

(54) MULTILAYER ELECTRONIC COMPONENT

(71) Applicant: SAMSUNG ELECTRO-MECHANICS CO., LTD., Suwon-si (KR)

(72) Inventors: Cheol Woo Park, Suwon-si (KR); Jin Hyung Lim, Suwon-si (KR); Seung Hun Han, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 550 days.

(21) Appl. No.: 17/877,507

(22) Filed: Jul. 29, 2022

(65) Prior Publication Data

US 2023/0215652 A1    Jul. 6, 2023

(30) Foreign Application Priority Data

Dec. 31, 2021   (KR) .................. 10-2021-0194497

(51) Int. Cl.
*H01G 4/30* (2006.01)
*H01G 4/008* (2006.01)
(Continued)

(52) U.S. Cl.
CPC ............ *H01G 4/30* (2013.01); *H01G 4/008* (2013.01); *H01G 4/012* (2013.01); *H01G 4/1227* (2013.01); *H01G 4/232* (2013.01)

(58) Field of Classification Search
CPC ...... H01G 4/008; H01G 4/012; H01G 4/1227; H01G 4/232; H01G 4/30
See application file for complete search history.

(56) References Cited

U.S. PATENT DOCUMENTS

2015/0084481 A1*  3/2015  Mori ............... H01G 4/252
                                                      29/829
2015/0084487 A1   3/2015  Mori et al.
(Continued)

FOREIGN PATENT DOCUMENTS

JP    2015-65283 A    4/2015
JP    2016-178219 A   10/2016
(Continued)

OTHER PUBLICATIONS

Korean Office Action dated Nov. 5, 2025 issued in Korean Patent Application No. 10-2025-0002612 (with English translation).

*Primary Examiner* — Nathan Milakovich
(74) *Attorney, Agent, or Firm* — Morgan Lewis & Bockius LLP

(57) ABSTRACT

A multilayer electronic component includes: a body including a dielectric layer and first and second internal electrodes and having first to sixth surfaces; a first external electrode including a first connection portion on the third surface, a first band portion on the first surface, and a third band portion on the second surface; a second external electrode including a second connection portion on the fourth surface, a second band portion on the first surface, and a fourth band portion on the second surface; an insulating layer disposed on the first and second connection portions and covering the second surface, and third and fourth band portions; and first and second plating layers respectively disposed on the first and second band portions. The insulating layer includes an oxide containing Ti. The dielectric layer includes one of $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) and $Ba(Ti_{1-y}Zr_y)O_3$ ($0<y<1$) as a main component.

26 Claims, 38 Drawing Sheets

(51) Int. Cl.
      *H01G 4/012*     (2006.01)
      *H01G 4/12*      (2006.01)
      *H01G 4/232*     (2006.01)

(56) References Cited

U.S. PATENT DOCUMENTS

| | | | |
|---|---|---|---|
| 2015/0223340 A1* | 8/2015 | Jung | H01G 4/008 |
| | | | 156/89.12 |
| 2016/0276104 A1 | 9/2016 | Nishisaka et al. | |
| 2017/0250028 A1* | 8/2017 | Makino | H01G 4/248 |
| 2017/0256359 A1* | 9/2017 | Masunari | H01G 4/005 |
| 2019/0096583 A1* | 3/2019 | Sasaki | H01G 4/232 |
| 2019/0103224 A1* | 4/2019 | Han | H01G 4/2325 |
| 2020/0066444 A1* | 2/2020 | Yang | H01G 4/232 |
| 2021/0217560 A1 | 7/2021 | Kim et al. | |
| 2022/0301778 A1* | 9/2022 | Suga | H05K 1/181 |

FOREIGN PATENT DOCUMENTS

| | | |
|---|---|---|
| KR | 10-2019-0038237 A | 4/2019 |
| KR | 10-2020-0022268 A | 3/2020 |
| KR | 10-2021-0089860 A | 7/2021 |

\* cited by examiner

MULTILAYER ELECTRONIC COMPONENT

CROSS-REFERENCE TO RELATED APPLICATION(S)

This application claims benefit of priority to Korean Patent Application No. 10-2021-0194497 filed on Dec. 31, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

The multilayer ceramic capacitor has a small size, implements high capacitance, and is easily mounted on a circuit board, and may thus be used as a component of various electronic devices. There has been increasing demand for a multilayer ceramic capacitor to have a smaller size and higher capacitance as each of various electronic devices such as a computer and a mobile device have a smaller size and higher output.

In addition, in recent years, as industry interest in electronic products has increased, multilayer ceramic capacitors have been required to have high reliability characteristics to be used in automobiles and infotainment systems.

To achieve miniaturization and high capacitance of a multilayer ceramic capacitor, the number of laminated layers needs to be increased by forming internal electrodes and dielectric layers to be thin, and a volume of a portion which does not affect formation of capacitance needs to be significantly reduced to increase an effective volume fraction required to implement capacitance.

In addition, a mounting space needs to be significantly reduced to mount as many components as possible in a limited area of a substrate.

In addition, as a thickness of a margin decreases with miniaturization and high capacitance of the multilayer ceramic capacitor, permeation of external moisture or permeation of a plating solution may be facilitated, and thus reliability may be weakened. Accordingly, there is a need for a method capable of protecting the multilayer ceramic capacitor from permeation of external moisture or permeation of a plating solution.

SUMMARY

An aspect of the present disclosure is to provide a multilayer electronic component having an improved capacitance per unit volume.

An aspect of the present disclosure is to provide a multilayer electronic component having improved reliability.

An aspect of the present disclosure is to provide a multilayer electronic component capable of minimizing a mounting space.

According to an aspect of the present disclosure, a multilayer electronic component may include: a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction, a first external electrode including a first connection portion disposed on the third surface, a first band portion extending from the first connection portion onto a portion of the first surface, and a third band portion extending from the first connection portion onto a portion of the second surface; a second external electrode including a second connection portion disposed on the fourth surface, a second band portion extending from the second connection portion onto a portion of the first surface, and a fourth band portion extending from the second connection portion onto a portion of the second surface; an insulating layer disposed on the first and second connection portions, and disposed to cover the second surface, and third and fourth band portions; a first plating layer disposed on the first band portion; and a second plating layer disposed on the second band portion. The insulating layer may include an oxide containing Ti. The dielectric layer may include one of $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ and $Ba(Ti_{1-y}Zr_y)O_3$ $(0<y<1)$ as a main component.

According to an aspect of the present disclosure, a multilayer electronic component may include: a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, and a first band portion extending from the first connection portion onto a portion of the first surface; a second external electrode including a second connection portion disposed on the fourth surface, and a second band portion extending from the second connection portion onto a portion of the first surface; an insulating layer disposed on the second surface and disposed to extend onto the first and second connection portions; a first plating layer disposed on the first band portion; and a second plating layer disposed on the second band portion. The insulating layer may include an oxide containing Ti. The dielectric layer may include one of BaTiO3, (Ba1-xCax)TiO3 $(0<x<1)$, Ba(Ti1-yCay)O3 $(0<y<1)$, (Ba1-xCax)(Ti1-yZry)O3 $(0<x<1, 0<y<1)$ and Ba(Ti1-yZry)O3 $(0<y<1)$ as a main component. The first and second external electrodes may be disposed on a level the same as or lower than an extension line of the second surface.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
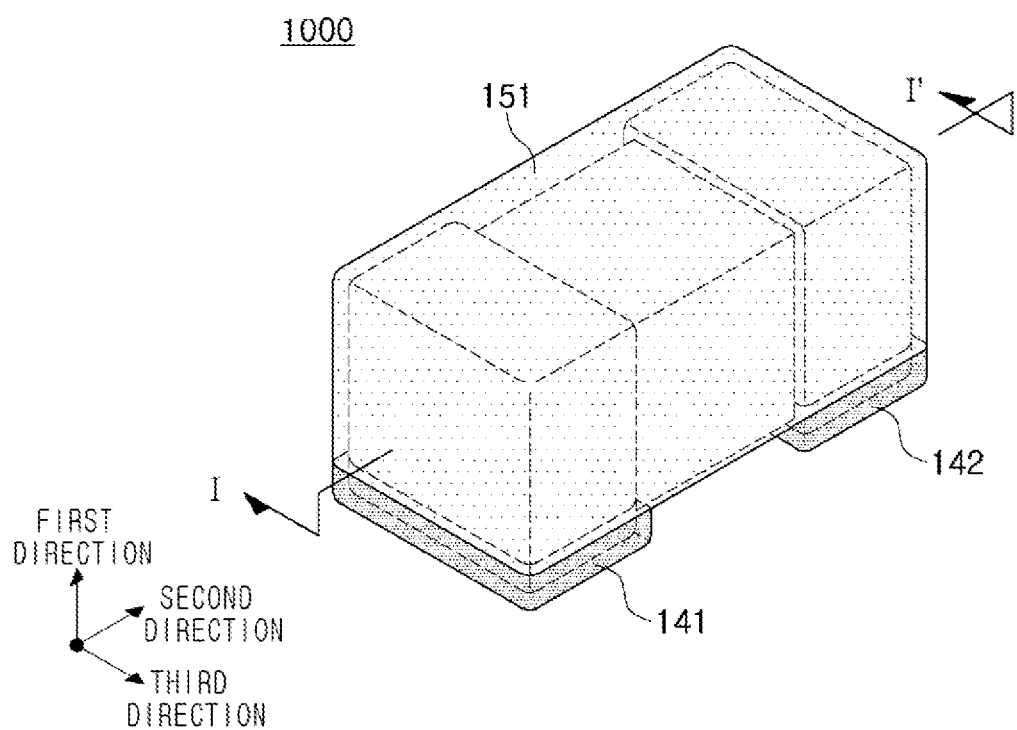
FIG. 1 is a schematic perspective view of a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, certain elements may be omitted to clearly illustrate the present disclosure, and to clearly express a plurality of layers and areas, thicknesses may be magnified. The same elements having the same function within the scope of the same concept will be described using the same reference numeral. Further, throughout the specification, it will be understood that when a portion "includes" an element, it can further include another element, not excluding another element, unless otherwise indicated.

The term "an exemplary embodiment" used herein does not refer to the same exemplary embodiment, and is provided to emphasize a particular feature different from that of another exemplary embodiment. However, exemplary embodiments provided herein may be implemented by being combined in whole or in part one with one another. For example, one element described in a particular exemplary embodiment may be understood as a description related to another exemplary embodiment even if it is not described in another exemplary embodiment, unless an opposite or contradictory description is provided therein.

In the drawings, a first direction may refer to a thickness (T) direction, a second direction may refer to a length (L) direction, and a third direction may refer to a width (W) direction.

FIG. 1 is a schematic perspective view of a multilayer electronic component according to an embodiment of the present disclosure.

Figure 2:
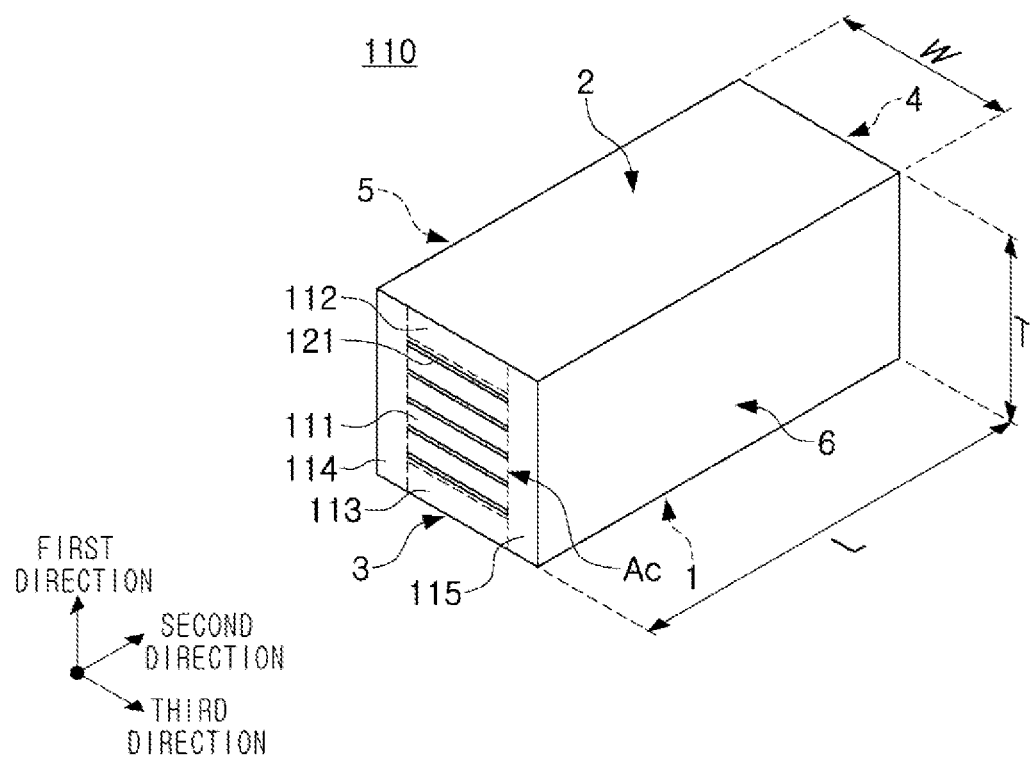
FIG. 2 is a schematic perspective view of a body of the multilayer electronic component of FIG. 1.

FIG. 2 is a schematic perspective view of a body of the multilayer electronic component of FIG. 1.

Figure 3:
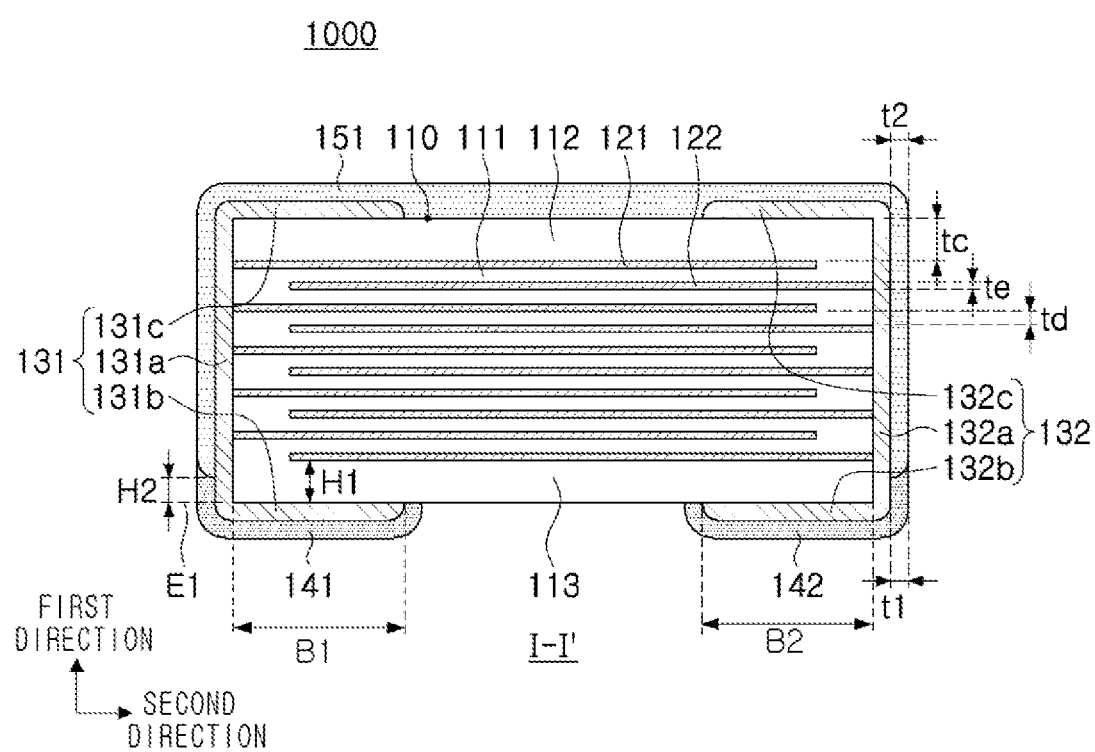
FIG. 3 is a cross-sectional view taken along line I-I' of FIG. 1.

FIG. 3 is a cross-sectional view taken along line I-I' of FIG. 1.

Figure 4:
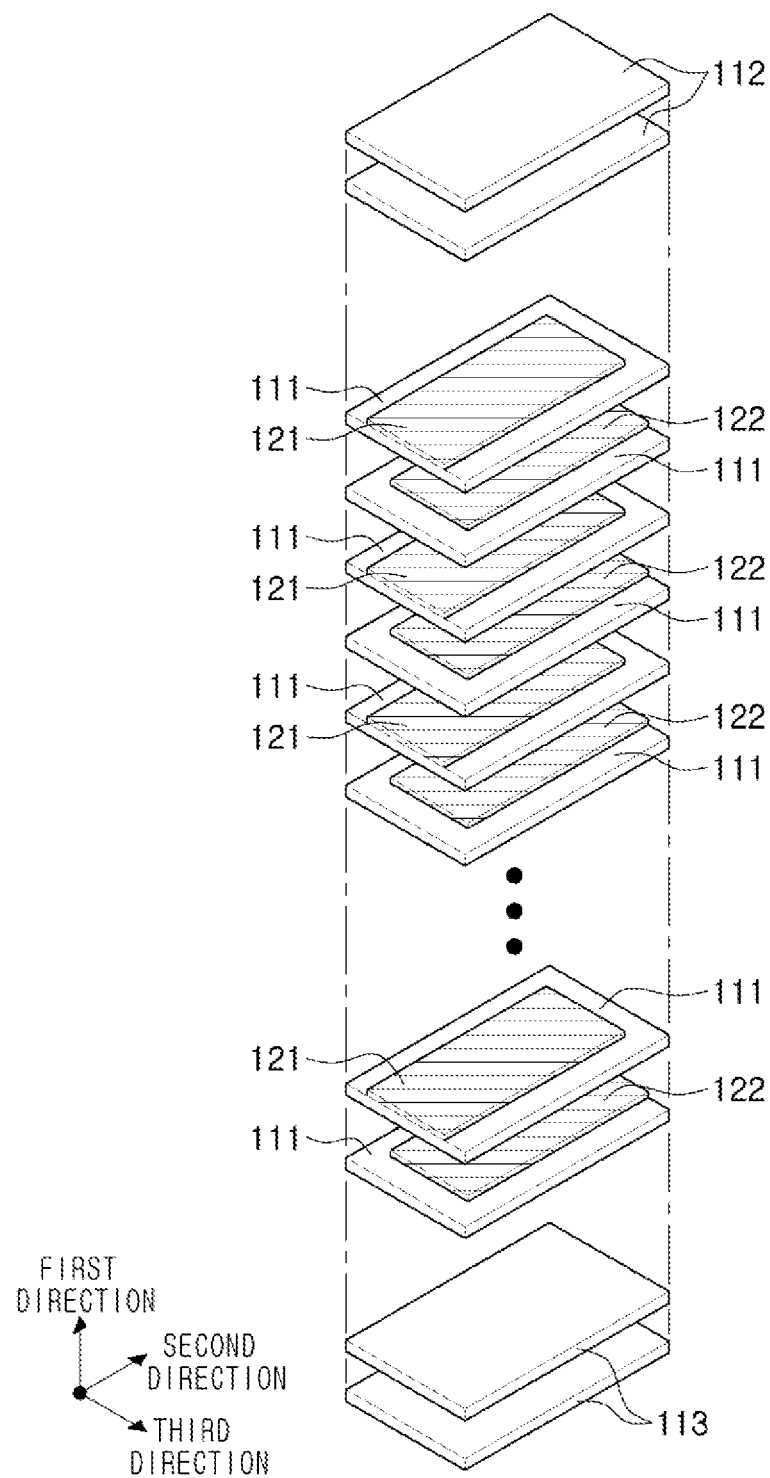
FIG. 4 is a schematic exploded perspective view of the body of FIG. 2.

FIG. 4 is a schematic exploded perspective view of the body of FIG. 2.

Figure 5:
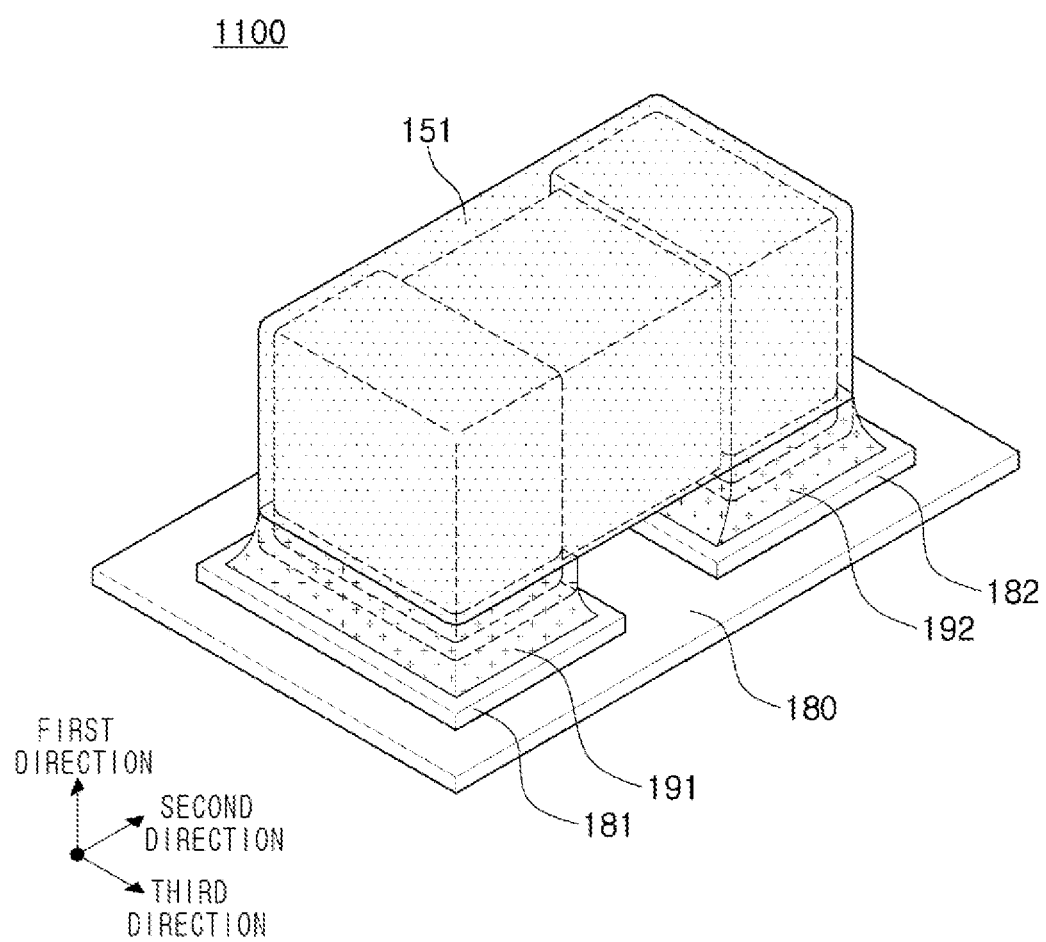
FIG. 5 is a schematic perspective view of a substrate on which the multilayer electronic component of FIG. 1 is mounted.

FIG. 5 is a schematic perspective view of a substrate on which the multilayer electronic component of FIG. 1 is mounted.

Hereinafter, a multilayer electronic component 1000 according to an embodiment in the present disclosure will be described with reference to FIGS. 1 to 5.

According to an embodiment of the multilayer electronic component 1000 may include: a body 110 including a dielectric layer 111 and first and second internal electrodes 121 and 122 alternately disposed with the dielectric layer 111 interposed therebetween, the body 110 having first and second surfaces 1 and 2 and opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction, a first external electrode 131 including a first connection portion 131a disposed on the third surface 3, a first band portion 131b extending from the first connection portion 131a onto a portion of the first surface 1, and a third band portion 131c extending from the first connection portion 131a onto a portion of the second surface 2; a second external electrode 132 including a second connection portion 132a disposed on the fourth surface 4, a second band portion 132b extending from the second connection portion 132a onto a portion of the first surface 1, and a fourth band portion 132c extending from the second connection portion 132a onto a portion of the second surface 2; an insulating layer 151 disposed on the first and second connection portions 131a and 132a, and disposed to cover a region of the third surface 3, in which the third and fourth band portions 131c and 132c are not disposed; a first plating layer 141 disposed on the first band portion 131b; and a second plating layer 142 disposed on the second band portion 132b.

In the body 110, the dielectric layer 111 and the internal electrodes 121 and 122 may be alternately stacked.

The body 110 is not limited to a particular shape, and may have a hexahedral shape or a shape similar to the hexahedral shape, as illustrated in the drawings. The body 110 may not have the shape of a hexahedron having perfectly straight lines because ceramic powder particles included in the body 110 are contracted in a process in which the body is sintered. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4, and opposing each other in a third direction.

In an embodiment, the body 110 may have a 1-3 corner connecting the first and third surfaces 1 and 3, a 1-4 corner connecting the first and fourth surfaces 1 and 4, a 2-3 corner connecting the second and third surfaces 2 and 3, and a 2-4 corner connecting the second and fourth surfaces 2 and 4, and the 1-3 corner and the 2-3 corner may have a form contracted to a center of the body 110 in the first direction, toward the third surface 3, and the 1-4 corner and the 2-4 corner may have a form contracted to a center of the body 110 in the first direction, toward the fourth surface 4.

As a margin portion, in which the internal electrodes 121 and 122 are not disposed, overlaps the dielectric layer 111, a step may be formed by thicknesses of the internal electrodes 121 and 122, so that a corner connecting the first surface 1 to the third to fifth surfaces 3 to 5 and/or a corner connecting the second surface 2 to the third to fifth surfaces 3 to 5 may have a shape contracted to a center of the body 110 in the first direction when viewed with respect to the first surface 1 or the second surface 2. Alternatively, by contraction behavior during a sintering process of the body 110, a corner connecting the first surface 1 to the third to sixth surfaces 3 to 6 and/or a corner connecting the second surface 2 to the third to sixth surfaces 3 to 6 may have a shape contracted to a center of the body 110 in the first direction when viewed with respect to the first surface 1 or the second surface 2. Alternatively, as a corner connecting respective surfaces of the body 110 to each other is rounded by performing an additional process to prevent chipping defects, or the like, a corner connecting the first surface 1 to the third to sixth surfaces 3 to 6 and/or a corner connecting the second surface 2 to the third to sixth surfaces 3 to 6 may have a rounded shape.

The corner may include a 1-3 corner connecting the first surface 1 and the third surface 3, a 1-4-th corner connecting the first surface 1 and the fourth surface 4, a 2-3 corner connecting the second surface 2 and the third surface 4, and a 2-4 corner connecting the second surface 2 and the fourth surface 4. In addition, the corner may include a 1-5 corner connecting the first surface 1 and the fifth surface 5, a 1-6 corner connecting the first surface 1 and the sixth surface 6, a 2-5 corner connecting the second surface 2 and the fifth surface 5, and a 2-6 corner connecting the second surface 2 and the sixth surface 6. The first to sixth surfaces 1, 2, 3, 4, 5, and 6 of the body 110 may be overall planar surfaces, and non-planar regions may be corners. Hereinafter, an extension line of each surface may refer to a line extending based on a planar portion of each surface.

In this case, a region of the external electrodes 131 and 132, disposed on a corner of the body 110 may be referred to as a corner portion, a region disposed on the third and fourth surfaces 3 and 4 of the body 110 may be referred to as a connection portion, and a region disposed on the first and second surfaces 1 and 2 of the body 110 may be referred to as a band portion.

Meanwhile, in order to suppress a step formed by the Internal electrodes 121 and 122, after the internal electrodes are cut so as to be exposed to the fifth and sixth surfaces 5 and 6 of the body after lamination, when margin portions 114 and 115 are formed by laminating a single dielectric layer or two or more dielectric layers on both side surfaces of the capacitance formation portion Ac in a third direction (width direction), a portion connecting the first surface 1 to the fifth and sixth surfaces 5 and 6 and a portion connecting the second surface 2 to the fifth and sixth surfaces 5 and 6 may not have a contracted form.

A plurality of dielectric layers 111 forming the body 110 may be in a sintered state, and adjacent dielectric layers 111 may be integrated with each other, such that boundaries therebetween may not be readily apparent without a scanning electron microscope (SEM).

According to an embodiment in the present disclosure, a raw material of the dielectric layer 111 is not particularly limited as long as sufficient capacitance may be obtained. For example, a barium titanate-based material, a lead composite perovskite-based material, a strontium titanate-based material, or the like, may be used as the raw material of the dielectric layer 111.

In particular, when the dielectric layer 111 includes one of $BaTiO_3$, $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) and $Ba(Ti_{1-y}Zr_y)O_3$ (0<y<1) as a main component, bonding strength with an insulating layer including an oxide containing Ti may be improved, and a moisture resistance reliability improvement effect, and a crack generation and suppression effect according to the insulating layer including the oxide containing Ti may be further improved.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

Meanwhile, an average thickness "td" of the dielectric layer 111 does not need to be particularly limited.

However, in general, when the dielectric layer is formed to be thin to have a thickness of less than 0.6 μm, and in particular, when the thickness of the dielectric layer is 0.35 μm or less, reliability may be deteriorated.

According to an embodiment, by disposing an insulating layer on a connection portion of the external electrode, and a plating layer on a band portion of the external electrode, permeation of external moisture, permeation of a plating solution, and the like, may be prevented to improve reliability. Therefore, even when the average thickness of the dielectric layer 111 is 0.35 μm or less, improved reliability may be ensured.

Therefore, when the average thickness of the dielectric layer 111 is 0.35 μm or less, a reliability improvement effect of the multilayer electronic component according to the present disclosure may become more remarkable.

The average thickness "td" of the dielectric layer 111 may refer to an average thickness of the dielectric layer 111 disposed between the first and second internal electrodes 121 and 122.

The average thickness of the dielectric layer 111 may be measured from an image obtained by scanning a cross section of the body 110 in the length and thickness directions (L-T) with a scanning electron microscope (SEM) of 10,000 magnifications. More specifically, an average value may be measured by measuring thicknesses of one dielectric layer at 30 points positioned at equal intervals in the length direction in the obtained image. The 30 points positioned at equal intervals may be designated in the capacitance formation portion Ac. In addition, when an average thickness of ten dielectric layers is measured, the average thickness of the dielectric layers may further be generalized.

The body 110 may include a capacitance formation portion Ac, disposed in the body 110 and including a first internal electrode 121 and a second internal electrode 122 disposed to face each other with the dielectric layer 111 interposed therebetween, and cover portions 112 and 113, disposed above and below the capacitance formation portion Ac in the first direction.

In addition, the capacitance formation portion Ac, which contributes to formation of capacitance of a capacitor, may be formed by repeatedly laminating a plurality of first and second internal electrodes 121 and 122 with the dielectric layer 111 interposed therebetween.

The cover portions 112 and 113 may include an upper cover portion 112, disposed above the capacitance formation portion Ac in the first direction, and a lower cover portion 113 disposed below the capacitance formation portion Ac in the first direction.

The upper cover portion 112 and the lower cover portion 113 may be formed by laminating a single dielectric layer or two or more dielectric layers on upper and lower surfaces of the capacitance formation portion Ac, respectively, in the thickness direction, and may basically serve to prevent damage to the internal electrodes caused by physical or chemical stress.

The upper cover portion 112 and the lower cover portion 113 may include the band electrodes 123 and 124, but may not include the internal electrodes, and may include the same material as the dielectric layer 111.

That is, the upper cover portion 112 and the lower cover portion 113 may include a ceramic material such as a barium titanate ($BaTiO_3$)-based ceramic material.

Meanwhile, an average thickness of the cover portions 112 and 113 does not need to be particularly limited. However, an average thickness "tc" of the cover portion 112 or 113 may be 15 μm or less to more easily achieve the miniaturization and the high capacitance of the multilayer electronic component. In addition, according to an embodiment, when an insulating layer is disposed on an external electrode according to an embodiment of the present disclosure, permeation of external moisture and permeation of a plating solution may be prevented to improve reliability. Therefore, improved reliability may be ensured even when the average thickness "tc" of the cover portions 112 or 113 is 15 μm or less.

The average thickness "tc" of the cover portion 112 or 113 may refer to a size in the first direction, and may be an average value of sizes, in the first direction, of the upper cover portion 112 measured at five points disposed at equal intervals on the upper or lower surface of the capacitance formation portion Ac.

In addition, margin portions 114 and 115 may be disposed on side surfaces of the capacitance formation portion Ac.

The margin portions 114 and 115 may include a margin portion 114, disposed on the fifth surface 5 of the body 110, and a margin portion 115 disposed on the sixth surface 6 of the body 110. That is, the margin portions 114 and 115 may be disposed on both end surfaces of the body 110 in the width direction.

The margin portions 114 and 115 may refer to regions between both ends of the first and second internal electrodes 121 and 122 and boundary surfaces of the body 110 in a cross-section of the body 110 taken in the width-thickness (W-T) directions, as illustrated in FIG. 3.

The margin portions 114 and 115 may basically serve to prevent damage to the internal electrodes caused by physical or chemical stress.

The margin portions 114 and 115 may be formed by applying a conductive paste to ceramic green sheets, except for places in which the margin portions are to be formed to form the internal electrodes.

In addition, to suppress a step formed by the internal electrodes 121 and 122, the margin portions 114 and 115 may be formed by laminating ceramic green sheets, cutting the laminated ceramic green sheets to expose the internal electrodes to the fifth and sixth surfaces 5 and 6 of the body 110, and then laminating a single dielectric layer or two or more dielectric layers on both side surfaces of the capacitance formation portion Ac in the third direction (the width direction).

Meanwhile, widths of the margins 114 and 115 do not need to be limited. However, an average width of the margin portions 114 or 115 may be 15 µm or less to more easily achieve miniaturization and high capacitance of the multilayer electronic component. In addition, according to an exemplary embodiment, by disposing a cover layer on a connection portion of an external electrode and disposing a plating layer on a band portion of the external electrode, permeation of external moisture and permeation of a plating solution may be prevented to improve reliability. Therefore, improved reliability may be ensured even when the average width of the margin portion 114 or 115 is 15 µm or less.

The average width of the margin portions 114 and 115 may refer to an average value of sizes, in the third direction, of the margin portions 114 and 115 measured at five points disposed at equal intervals on a side surface of the capacitance formation portion Ac.

The internal electrodes 121 and 122 may be laminated alternately with the dielectric layer 111.

The internal electrodes 121 and 122 may include first and second internal electrodes 121 and 122. The first and second internal electrodes 121 and 122 may be alternately disposed to face each other with the dielectric layer 111, constituting the body 110, interposed therebetween, and may be exposed to the third and fourth surfaces 3 and 4 of the body 110, respectively.

Referring to FIG. 3, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body to be connected to the first internal electrode 121, and a second external electrode 132 may be disposed on the fourth surface 4 of the body to be connected to the second internal electrode 122.

That is, the first internal electrode 121 may not be connected to the second external electrode 132 and may be connected to the first external electrode 131, and the second internal electrode 122 may not be connected to the first external electrode 131 and may be connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately laminating a ceramic green sheet, on which the first internal electrode 121 is printed, and a ceramic green sheet, on which the second internal electrode 122 is printed, and sintering the laminated ceramic green sheets.

A material of the internal electrodes 121 and 122 is not particularly limited, and may be a material having excellent electrical conductivity. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on ceramic green sheets. A method of printing the conductive paste for internal electrodes may be a screen printing method, a gravure printing method, or the like, but embodiments of the present disclosure are not limited thereto.

Meanwhile, an average thickness "te" of the internal electrodes 121 and 122 does not need to be particularly limited.

However, in general, when the internal electrodes are formed to have a small thickness of less than 0.6 µm, in particular, when the thickness of the internal electrodes is 0.35 µm or less, reliability may be deteriorated.

According to an embodiment of the present disclosure, by disposing an insulating layer on an external electrode, permeation of external moisture and permeation of a plating solution may be prevented to improve reliability. Therefore, improved reliability may be ensured even when the average thickness of the internal electrodes 121 and 122 is 0.35 µm or less. The miniaturization and the high capacitance of the multilayer electronic component may be more easily achieved.

Therefore, improved reliability may be ensured even when the average thickness of the internal electrodes 121 and 122 is 0.35 µm or less. The miniaturization and the high capacitance of the multilayer electronic component may be more easily achieved.

The average thickness "te" of the internal electrode 121 and 122 may mean an average thickness of the internal electrode 121 and 122.

The average thickness of the internal electrode 121 and 122 may be measured from an image obtained by scanning a cross-section of the body 110 in the length and thickness directions (L-T) with a scanning electron microscope (SEM) of 10,000 magnifications. More specifically, an average value may be measured by measuring thicknesses of one internal electrode at 30 points positioned at equal intervals in the length direction in the scanned image. The 30 points positioned at equal intervals may be designated in the capacitance formation portion Ac. In addition, when an average thickness of ten internal electrodes is measured, the average thickness of the internal electrodes may further be generalized.

External electrodes 131 and 132 may be disposed on the third surface 3 and the fourth surface 4 of the body 110. The external electrode 131 and 132 may include first and second external electrodes 131 and 132, respectively disposed on the third and fourth surfaces 3 and 4 of the body 110, to be respectively connected to the first and second internal electrodes 121 and 122.

The external electrodes 131 and 132 may include a first external electrode 131 including a first connection portion 131a disposed on the third surface 3, and a first band portion 131b extending from the first connection portion 131a onto a portion of the first surface 1, and a second external electrode 132 including a second connection portion 132a disposed on the fourth surface 4, and a second band portion 132b extending from the second connection portion 132a onto a portion of the first surface 1. The first connection portion 131a may be connected to the first internal electrode 121 on the third surface 3, and the second connection portion 132a may be connected to the second internal electrode 122 on the fourth surface 4.

In addition, the first external electrode 131 may include a third band portion 131c extending from the first connection portion 131a to a portion of the second surface 2, and the second external electrode 132 may include a fourth band portion 132c extending from the second connection portion 132a onto a portion of the second surface 2. Furthermore, the first external electrode 131 may include a side band portion extending from the first connection portion 131a onto a portion of the fifth and sixth surfaces 5 and 6, and the second external electrode 132 may include a side band portion extending from the second connection portion 132a onto a portion of the fifth and sixth surfaces 5 and 6.

The first and second external electrodes 131 and 132 may not be disposed on the second surface 2, and may not be disposed on the fifth and sixth surfaces 5 and 6. As the first and second external electrodes 131 and 132 are not disposed on the second surface 2, the first and second external electrodes 131 and 132 may be disposed on a level the same as or lower than a level of an extension line of the second surface 2 of the body. In addition, the first and second connection portions 131a and 132a may be disposed to be spaced apart from the fifth and sixth surfaces 5 and 6, and the first and second connection portions 131a and 132a may be disposed to be spaced apart from the second surface 2. In addition, the first and second band portions 131b and 132b may also be disposed to be spaced apart from the fifth and sixth surfaces 5 and 6.

Meanwhile, when the first and second external electrode 131 and 132 include third and fourth band portions 131c and 132c, an insulating layer is disposed on the third and fourth band portions 131c an 132c, but an embodiment of the present disclosure is not limited thereto, and in order to improve ease of mounting. In addition, the first and second external electrodes 131 and 132 may include the third and fourth band portions 131c and 132c, but may not include a side band portion. In this case, the first and second connection portions 131a and 132a and the first to fourth band portions 131a, 132b, 131c, and 132c may have a form spaced apart from the fifth and sixth surfaces 5 and 6.

A structure, in which the multilayer electronic component 1000 has two external electrodes 131 and 132, has been described in the present embodiment. However, the number and shape of the external electrodes 131 and 132 may vary depending on the shape of the internal electrodes 121 and 122 or other objects.

Meanwhile, the external electrodes 131 and 132 may be formed of any material having electrical conductivity, such as a metal, and a specific material of each of the external electrodes 131 and 132 may be determined in consideration of electrical characteristics, structural stability, and the like. Furthermore, the external electrodes 131 and 132 may have a multilayer structure.

The electrode layers 131 and 132 may be sintered electrodes including a conductive metal and glass or resin-based electrodes including a conductive metal or a resin.

In addition, the external electrodes 131 and 132 may have a form in which sintered electrodes and resin-based electrodes are sequentially formed on the body. In addition, the external electrodes 131 and 132 may be formed by a method of transferring a sheet including a conductive metal onto the body, or may be formed by a method of transferring a sheet including a conductive metal onto a sintered electrode.

As the conductive metal included in the external electrodes 131 and 132, a material having improved electrical conductivity may be used, but is not particularly limited. For example, the conductive metal may be at least one of Cu, Ni, Pd, Ag, Sn, Cr, and alloys thereof. Preferably, the electrode layers 131 and 132 may include at least one of Ni and a Ni alloy, and accordingly, connectivity with the internal electrodes 121 and 122 including Ni may be further improved.

The insulating layer 151 may be disposed on the first and second connection portions 131a and 132a.

Since the first and second connection portions 131a and 132a are portions connected to the internal electrodes 121 and 122, they may be a path along which a plating solution permeates in a plating process or permeation of moisture during actual use. In the present disclosure, since the insulating layer 151 is disposed on the first and second connection portions 131a and 132a, permeation of external moisture or permeation of the plating solution can be prevented.

The insulating layer 151 may be disposed to be in contact with the first and second plating layers 141 and 142. In this case, the insulating layer 151 may be in contact thereto to 142 partially cover ends of the first and second plating layers 141 and 142, and may be in contact thereto to partially so that the first and second plating layers 141 and 142 partially cover an end of the insulating layer 151.

The insulating layer 151 may be disposed on the first and second connection portions 131a and 132a, and may be disposed to cover the second surface 2, and the third and fourth band portions 131c and 132c. In this case, the insulating layer 151 may be disposed to cover a region of the second surface, in which the third and fourth band portions 131c and 132c are not disposed. Accordingly, the insulating layer 151 may cover a region, in which ends of the third and fourth band portions 131c and 132c and the body 110 are in contact with each other, to block a moisture permeation path, so that moisture resistance reliability may be further improved.

The insulating layer 151 may be disposed on the second surface to extend to the first and second connection portions 131a and 132a. In addition, when the external electrodes 131 and 132 are not disposed on the second surface 2, the insulating layer 151 may be disposed to entirely cover the second surface. Meanwhile, the insulating layer 151 does not necessarily have to be disposed on the second surface, the insulating layer 151 may not be disposed on a portion or an entirety of the second surface, and the insulating layer 151 may be separated into two and respectively disposed on the first and second connection portions 131a and 132a. When the insulating layer 151 is not disposed on the entirety of the second surface, the insulating layer 151 may be disposed below an extension line of the second surface 2. In addition, although the insulating layer 151 is not disposed on the second surface 2, it may extend from the first and second connection portions 131a and 132a to the fifth and sixth surfaces 5 and 6 to form one insulating layer.

Furthermore, the insulating layer 151 may be disposed to cover the first and second side band portions, and portions of the fifth and sixth surfaces 5 and 6. In this case, the portions of the fifth and sixth surfaces 5 and 6 that are not covered by the insulating layer 151 may be exposed externally.

In addition, the insulating layer 151 may be disposed to cover an entirety of the first and second side band portions, the fifth and sixth surfaces 5 and 6, and in this case, since the fifth and sixth surfaces 5 and 6 are not exposed externally, moisture resistance reliability may be improved, and the connection portions 131a and 132a may also not be directly exposed externally, so that the reliability of the multilayer electronic component 1000 may be improved. In more detail, the insulating layer 151 may cover the entirety of the first and second side band portions, and cover all regions of the fifth and sixth surfaces 5 and 6 except for a region in which the first and second side band portions are formed.

The insulating layer 151 may serve to prevent the plating layers 141 and 142 from being formed on the external electrodes 131 and 132 on which the insulating layer 151 is disposed, and improve sealing characteristics to prevent moisture, a plating solution, or the like, from externally permeating.

The insulating layer 151 may include an oxide containing Ti.

In the related art, a glass-based material is generally used for the insulating layer, but due to a nature of the glass-based material, it is difficult to form a uniform film due to agglomeration during sintering, and since heat is generated during the sintering process, stress in the body can be generated, which can cause cracks or delamination. In addition, when an insulating layer including a glass-based material is used, a method of sintering the insulating layer including a glass-based material after Sintering an external electrode is used, but in a process of sintering the insulating layer, a metal material of the external electrode may diffuse into the internal electrode, which may cause radiation cracks. Furthermore, since the glass-based material generally has a hard characteristic, it may be broken even by a small impact.

In the present disclosure, by applying an oxide containing Ti instead of a glass-based material to the insulating layer, the problem of the glass-based insulating layer has been solved. The oxide containing Ti not only has insulating properties, but also has improved impact resistance compared to the glass-based oxide.

In addition, when the insulating layer 151 is formed using the oxide containing Ti, a more uniform and dense film can be formed than when the glass-based material is used, thereby effectively improving the moisture resistance reliability.

In addition, in the insulating layer 151 including an oxide containing Ti, the dielectric layer 111 includes one of $BaTiO_3$, $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) and $Ba(Ti_{1-y}Zr_y)O_3$ (0<y<1) as a main component, improved bonding strength may be secured, and the partial breakage of the insulating layer 151 may be suppressed. When the dielectric layer 111 includes materials other than the above materials as a main component, the bonding strength between the insulating layer 151 and the body 110 may be weakened, or the insulating layer 151 may be partially broken, so that it may be difficult to form a uniform and dense film.

Meanwhile, including a material as a main component may mean that the number of moles of other components relative to 100 moles of the main component is 20 moles or less.

In particular, when the dielectric layer 111 includes $BaTiO_3$ as a main component, or $(Ba_{1-x}Ca_x)TiO_3$ (0<x<1) as a main component, the bonding strength between the insulating layer 151 and the body 110 may be more improved, and it is possible to more easily form a uniform and dense film.

The component analysis of the dielectric layer 111 may be measured using a non-destructive method, a destructive method, or the like.

For example, in the case of the non-destructive method, a component of the dielectric layer can be analyzed using TEM-EDS. Specifically, a thinned analysis sample is prepared using a focused ion beam (FIB) device in a region including a dielectric layer among a cross-section of a sintered body. Then, a damaged layer on a surface of the thinned sample is removed using Ar ion milling, and thereafter, mapping and quantitative analysis of each component in the image obtained using STEM-EDS is performed. In this case, a quantitative analysis graph of each component may be obtained as a mass fraction of each element, which may be expressed by converting the same into a mole fraction or an atomic fraction.

In addition, in the case of the destructive method, a dielectric portion is screened after pulverizing the multilayer electronic component and removing the internal electrode, components of the screened dielectric may be analyzed using devices such as an inductively coupled plasma spectrometer (ICP-OES), an inductively coupled plasma mass spectrometer (ICP-MS), and the like.

A method of forming the insulating layer 151 does not need to be particularly limited.

For example, after forming the external electrodes 131 and 132 on the body 100, an insulating layer 151 including an oxide containing Ti may be formed using atomic layer deposition (ALD). That is, the insulating layer 151 may be formed by atomic layer deposition (ALD), and accordingly, a dense and uniform insulating layer 151 may be more easily formed, and a thickness of the insulating layer 151 may be easily adjusted. In addition, the atomic layer deposition may be performed in a temperature range of about 60° C. to about 200° C., but may not be limited thereto.

The type of oxide containing Ti included in the insulating layer is not particularly limited, but may be, for example, $TiO_2$.

In an embodiment, in the insulating layer 151, the number of moles of Ti atoms to the total number of moles of elements other than oxygen atoms may be 0.95 or more, That is, the insulating layer 151 may be substantially formed of an oxide including Ti, except for elements detected as impurities. In this case, the oxide containing Ti may be $TiO_2$. Accordingly, it is possible to further improve an effect of suppressing cracks due to thermal contraction, radiation cracks caused by metal diffusion, and the like, and an effect of improving moisture resistance reliability.

In this case, the component of the insulating layer 151 may be calculated from an image observed using scanning electron microscope-energy dispersive X-ray spectroscopy (SEM-EDS). Specifically, after the multilayer electronic component is polished to a central position in a width direction (third direction) to expose cross-sections in length and thickness direction (L-T cross-sections), the number of moles of each element included in the insulating layer can be measured using EDS in the central region among regions in which the insulating layer is divided into 5 equal parts in the thickness direction, and the number of moles of Ti atoms to the total number of moles of elements other than oxygen atoms may be calculated.

In an embodiment, an average thickness "t2" of the insulating layer 151 may be 50 nm or more and 1000 nm or less. When the average thickness "t2" of the insulating layer 151 is less than 50 nm, an effect suppressing cracks due to thermal contraction, radiation cracks due to metal diffusion, and the like, and an effect of improving moisture resistance reliability may not be sufficiently secured. When the average thickness "t2" of the insulating layer 151 exceeds 1000 nm, an insulating layer formation time may become too long and an overall size of the multilayer electronic component may become large.

The average thickness "t2" of the insulating layer 151 may be an average value of thicknesses measured at five points disposed at equal intervals on the first and second connection portions 131a and 132a. As a more specific example, the average thickness "t2" of the insulating layer 151 may be an average value of thicknesses measured at a central point of the first and second connection portions 131a and 132a in a first direction, two points spaced 5 μm, in the first direction, apart from the central point of the first and second connection portions 131a and 132a in the first direction, two points spaced 10 μm, in the first direction, apart from the central point of the first and second connection portions 131a and 132a in the first direction.

In an embodiment, the insulating layer 151 may be disposed to be in direct contact with the first and second external electrodes 131 and 132, and the first and second external electrodes 131 and 132 may include a conductive metal and glass. Accordingly, the plating layers 141 and 142 may not be disposed in a region, in which the insulating layer 151 is disposed, of the external surfaces of the first and second external electrodes 131 and 132, so that erosion of the external electrodes caused by a plating solution may be effectively suppressed.

In this case, the first plating layer 141 may be disposed to cover an end disposed on the first external electrode 131 of the first insulating layer 151, and the second plating layer 142 may be disposed to cover an end disposed on the second external electrode 132 of the second insulating layer 152. By forming the insulating layer 151 before forming the plating layers 141 and 142 on the external electrodes 131 and 132, the permeation of the plating solution during formation of the plating layer may be more reliably suppressed. As the insulating layer is formed before forming the plating layer, the plating layers 141 and 142 may have a form covering an end of the insulating layer 151.

The first and second plating layers 141 and 142 may be disposed on the first and second band portions 131b and 132b, respectively. The plating layers 141 and 142 may serve to improve the mounting characteristics. The plating layers 141 and 142 may be disposed on the band portions 131b and 132b to significantly reduce a mounting space and to significantly reduce permeation of a plating solution into an internal electrode, resulting in improve reliability. One end of the first and second plating layers 141 and 142 may be in contact with the first surface, and the other end thereof may be in contact with the insulating layer 151.

The type of the plating layers 141 and 142 is not limited. Each of the plating layers 141 and 142 may be a plating layer including at least one of Cu, Ni, Sn, Ag, Au, Pd, and alloys thereof, and may be formed as a plurality of layers.

As a more specific example of the plating layers 141 and 142, the plating layers 141 and 142 may be Ni plating layers or Sn plating layers, and may have a form in which Ni plating layers and Sn plating layers are sequentially formed on the first and second band portions 131b and 132b.

In an embodiment, the first and second plating layers 141 and 142 may disposed to extend to partially cover the first and second connection portions 131a and 132a, respectively. When an average size to an internal electrode, disposed to be closest to a first surface 1, among the first and second internal electrodes 121 and 122, in the first direction, is H1, and an average size from an extension line E1 of the first surface 1 to ends of the first and second plating layers 141 and 142 disposed on the first and second connection portions 131a and 132a, in the first direction is H2, H1>H2 (or H1≥H2) may be satisfied. Accordingly, the permeation of the plating solution into the internal electrode during the plating process may be suppressed to improve reliability.

The average sizes "H1" and "H2" may be values obtained by averaging values measured at five points at equal intervals, in the third direction, in a cross-section of the body 110 taken in the first and second directions (an L-T cross-section). The average size "H1" may be an average of values measured at a point in which the internal electrode disposed to be closest to the first surface 1 is connected to an external electrode in each cross-section, and the average size "H2" may be an average of values measured based on an end of the plating layer in contact with the external electrode. Extension lines of the first surface, serving as a reference when the average sizes "H1" and "H2" are measured, may be the same.

In an embodiment, the first plating layer 141 is disposed to cover an end disposed on the first external electrode 131 of the insulating layer 151, and the second plating layer 142 may be disposed to cover an end disposed on the external electrode 132 of the insulating layer 151. Accordingly, the adhesion between the insulating layer 151 and the plating layers 141 and 142 may be increased to improve the reliability of the multilayer electronic component 1000.

In an embodiment, the insulating layer 151 may be disposed to cover an end disposed on the first external electrode 131 of the first plating layer 141, and the insulating layer 151 may be disposed to cover an end disposed on the external electrode 132 of the second plating layer 142. Accordingly, the bonding strength between the insulating layer 151 and the plating layers 141 and 142 may be increased to improve the reliability of the multilayer electronic component 1000.

In an embodiment, when an average size of the body 110 in a second direction is L, an average size from an extension line of the third surface to an end of the first band portion in the second direction is B1, and an average size from an extension line of the fourth surface to an end of the second band portion in the second direction is B2, $0.2 \leq B1/L \leq 0.4$ and $0.2 \leq B2/L \leq 0.4$ may be satisfied.

When B1/L and B2/L are less than 0.2, it may be difficult to secure sufficient adhesion strength. On the other hand, when B2/L exceeds 0.4, leakage current may be generated between the first band portion 131b and the second band portion 132b under high-voltage current, and the first band portion 131b and the second band portion 132b may be electrically connected to each other by plating spreading, or the like, during a plating process.

The average sizes "B1", "B2", and "L" may be values obtained by averaging values measured at five points at equal intervals, in the third direction, in a cross-section of the body 110 taken in the first and second directions (an L-T cross-section).

Referring to FIG. 5 illustrating a mounting substrate 1100 on which the multilayer electronic component 1000 is mounted, the plating layers 141 and 142 of the multilayer electronic component 1000 may be bonded to electrode pads 181 and 182 by solders 191 and 192 disposed on a substrate 180.

Meanwhile, when the internal electrodes 121 and 122 are laminated in the first direction, the multilayer electronic component 1000 may be horizontally mounted on the substrate 180 such that the internal electrodes 121 and 122 are parallel to a mounting surface. However, embodiments are not limited to the case of horizontal mounting. When the internal electrodes 121 and 122 are laminated in the third direction, the multilayer electronic component 1000 may be vertically mounted on the substrate 180 such that the internal electrodes 121 and 122 are perpendicular to the mounting surface.

A size of the multilayer electronic component 1000 does not need to be limited.

However, to achieve both miniaturization and high capacitance, since the number of laminated layers should be increased by thinning dielectric layers and internal electrodes, an effect of improving reliability and capacitance per unit volume may become more remarkable in the multilayer electronic component 300 having a size of 1005 (length× width, 1.0 mm×0.5 mm).

Accordingly, when the multilayer electronic component 1000 has a length of 1.1 mm or less and a width of 0.55 mm or less in consideration of a manufacturing error, a size of an external electrode, and the like, a reliability improvement effect according to the present disclosure may be more remarkable. Here, the length of the multilayer electronic component 1000 may refer to a maximum size of the multilayer electronic component 1000 in the second direction, and the width of the multilayer electronic component 1000 may refer to a maximum size of the multilayer electronic component 1000 in the third direction.

Figure 6:
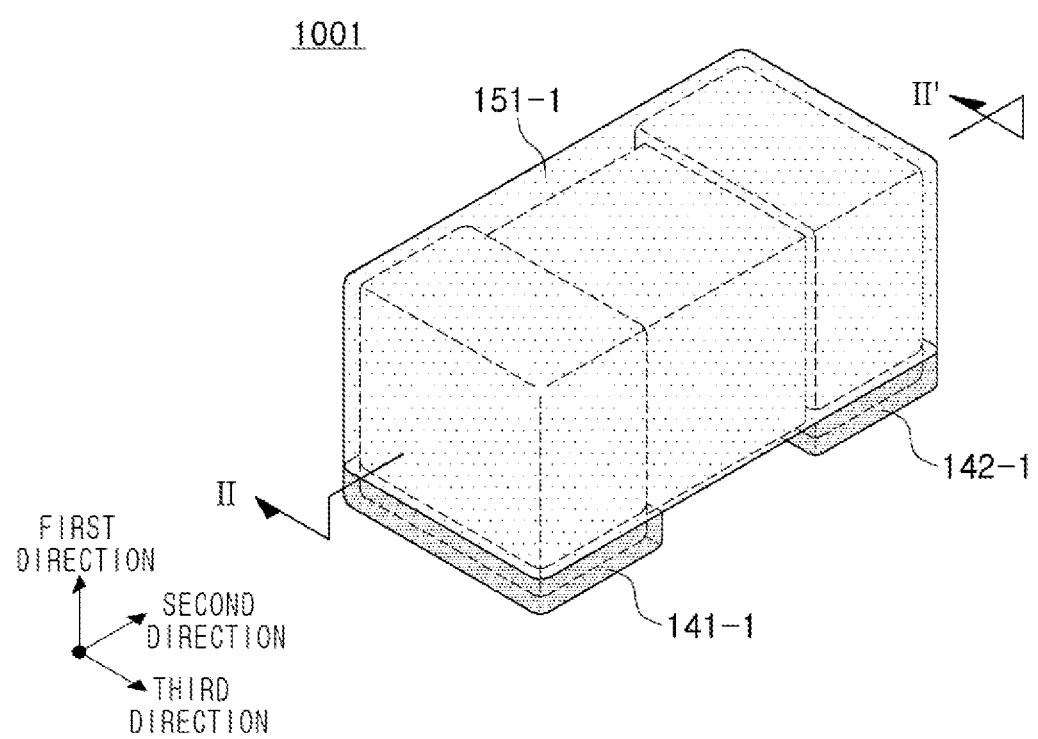
FIG. 6 is a schematic perspective view of a multilayer electronic component according to an embodiment of the present disclosure.
Figure 7:
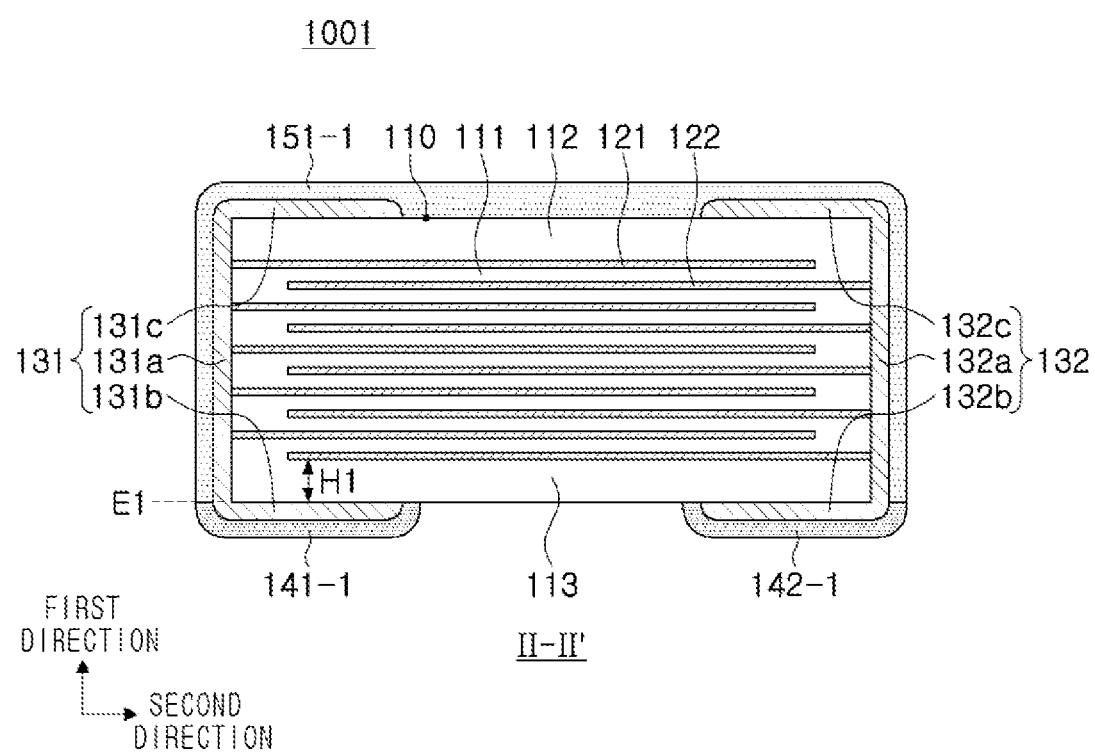
FIG. 7 is a cross-sectional view taken along line II-II' of FIG. 6.

FIG. 6 is a schematic perspective view of a multilayer electronic component 1001 according to an exemplary embodiment in the present disclosure. FIG. 7 is a cross-sectional view taken along line II-II' of FIG. 6.

Referring to FIGS. 6 and 7, in the multilayer electronic component 1001 according to an embodiment, first and second plating layers 141-1 and 142-1 may be disposed on a level the same as or lower than a level of an extension line E1 of a first surface 1. Accordingly, during mounting, a height of a solder may be significantly reduced and a mounting space may be significantly reduced.

In addition, the insulating layer 151-1 may be disposed to extend to a level the same as or lower than a level of the extension line E1 of the first surface 1 to be in contact with the first and second plating layers 141-1 and 142-1.

Figure 8:
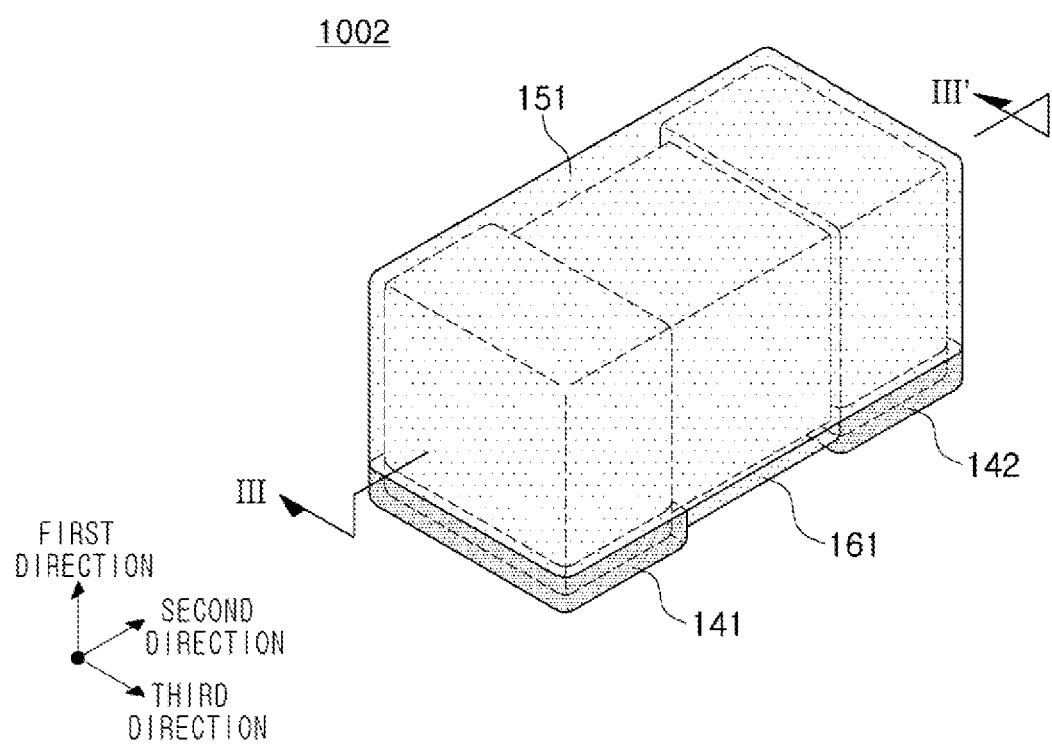
FIG. 8 is a schematic perspective view of a multilayer electronic component according to an embodiment of the present disclosure.
Figure 9:
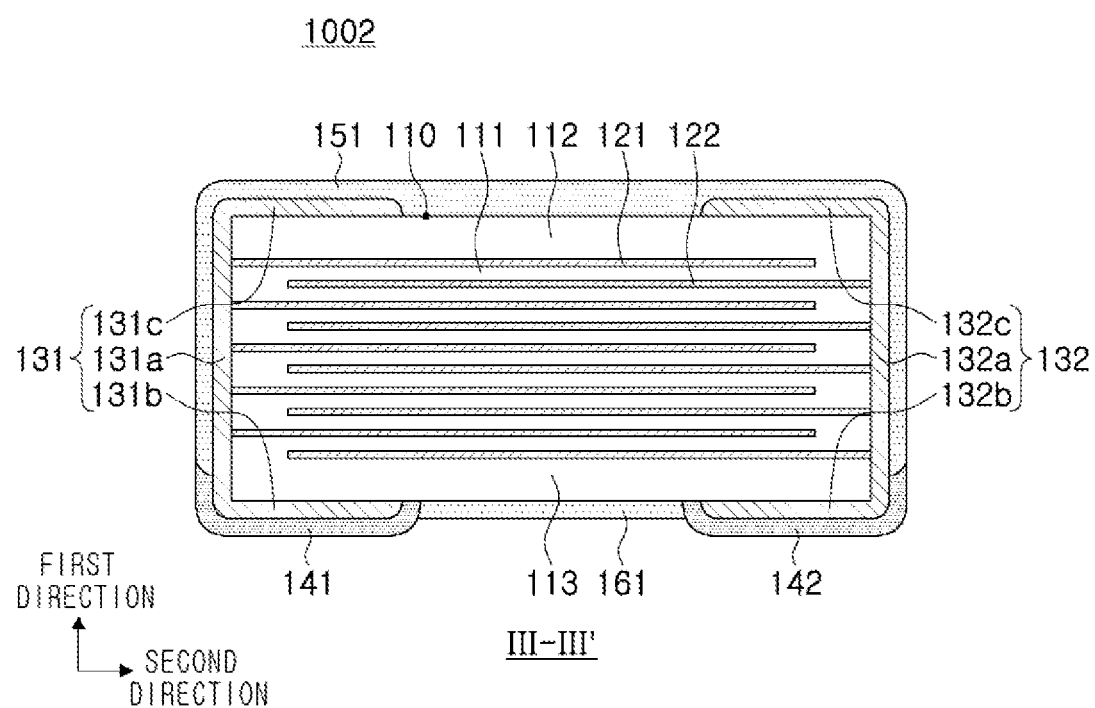
FIG. 9 is a cross-sectional view taken along line III-III' of FIG. 8.

FIG. 8 is a schematic perspective view of a multilayer electronic component 1002 according to an exemplary embodiment in the present disclosure. FIG. 9 is a cross-sectional view taken along line III-III' of FIG. 8.

Referring to FIGS. 8 and 9, the multilayer electronic component 1002 according to an embodiment may further include an additional insulating layer 161 disposed on a first surface 1 and disposed between a first band portion 131*b* and a second band portion 132*b*. Thus, leakage current, which may be generated between the first band portion 131*b* and the second band portion 132*b* under high-voltage current, or the like, may be prevented.

The type of the additional insulating layer 161 does not need to be limited. For example, the additional insulating layer 161 may include an oxide containing Ti, like the insulating layer 151, and may include $TiO_2$, and may be $TiO_2$. However, it is not necessary to limit the additional insulating layer 161 and the insulating layer 151 to the same material, and may be formed of different materials. For example, the additional insulating layer 161 may include at least one selected from an epoxy resin, an acrylic resin, ethyl cellulose, or the like, or may include glass.

Figure 10:
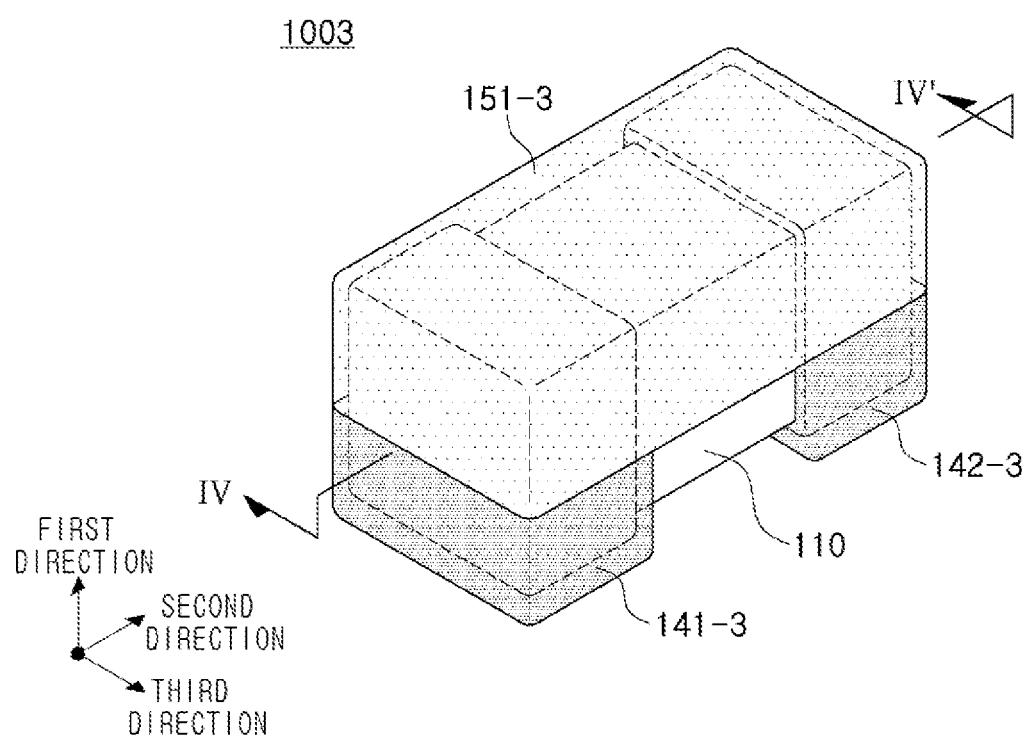
FIG. 10 is a schematic perspective view of a multilayer electronic component according to an embodiment of the present disclosure.
Figure 11:
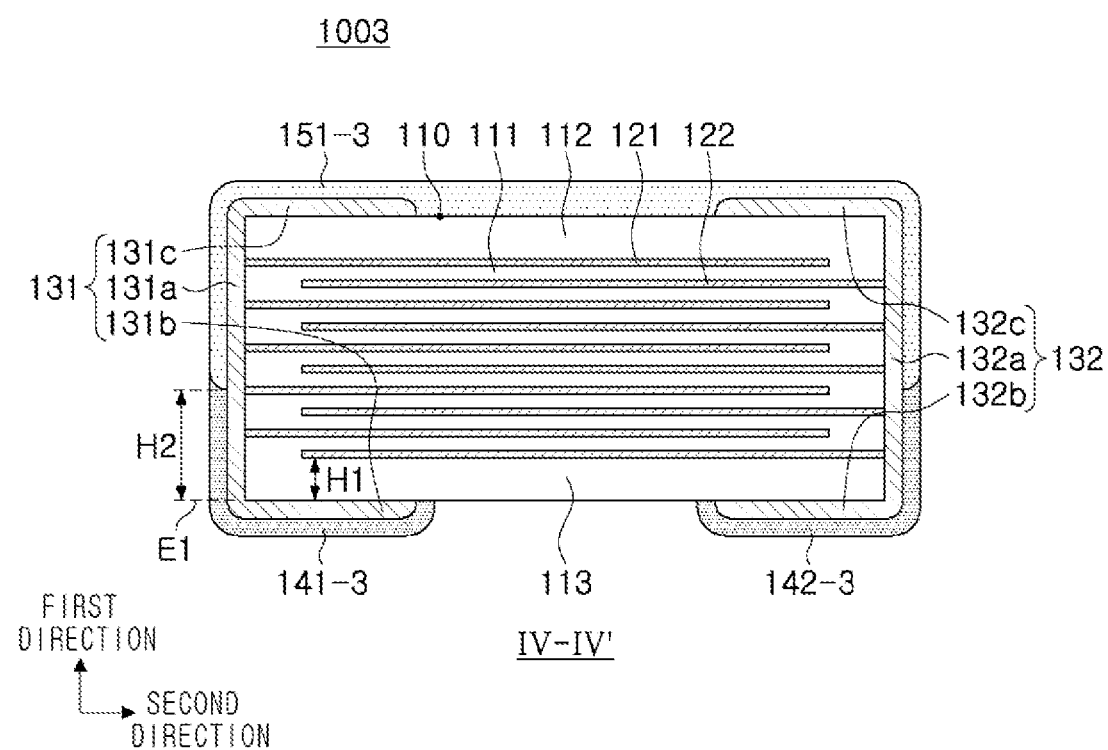
FIG. 11 is a cross-sectional view taken along line IV-IV' of FIG. 10.

FIG. 10 is a schematic perspective view of a multilayer electronic component 1003 according to an exemplary embodiment in the present disclosure. FIG. 11 is a cross-sectional view taken along line IV-IV' of FIG. 10.

Referring to FIGS. 10 and 11, in the multilayer electronic component 1003 according to an embodiment, when an average size from a first surface 1 to an internal electrode, disposed to be closest to the first surface 1, among the first and second internal electrodes 121 and 122, in a first direction, is H1, and an average size from an extension line of the first surface 1 to ends of plating layers 141-3 and 142-3 disposed on the first and second connection portions 131*a* and 132*a*, in a first direction is H2, H1<H2 may be satisfied. Accordingly, an area in contact with a solder during mounting may be increased to improve adhesion strength.

More preferably, when an average size of the body 110 in the first direction is T, H2<T/2 may be satisfied. That is, H1<H2<T/2 may be satisfied. This is because when the average size "H2" is greater than or equal to T/2, an effect of improving moisture resistance reliability by an insulating layer may be reduced.

The average sizes "H1," "H2," and "T" may be values obtained by averaging values measured at five points at equal intervals, in the third direction, in a cross-section of the body 110 taken in first and second directions (an L-T cross-section). The average size "H1" may be an average of values measured at a point in which an internal electrode disposed to be closest to the first surface 1 is connected to an external electrode in each cross-section, and the average size "H2" may be an average of values measured with respect to an end of a plating layer in contact with an external electrode in each cross-section. Extension lines of the first surface, serving as a reference when the average sizes "H1" and "H2" are measured, may be the same. In addition, the average size "T" may be a value averaged after measuring a maximum size of the body 110 in the first direction in each cross-section.

Figure 12:
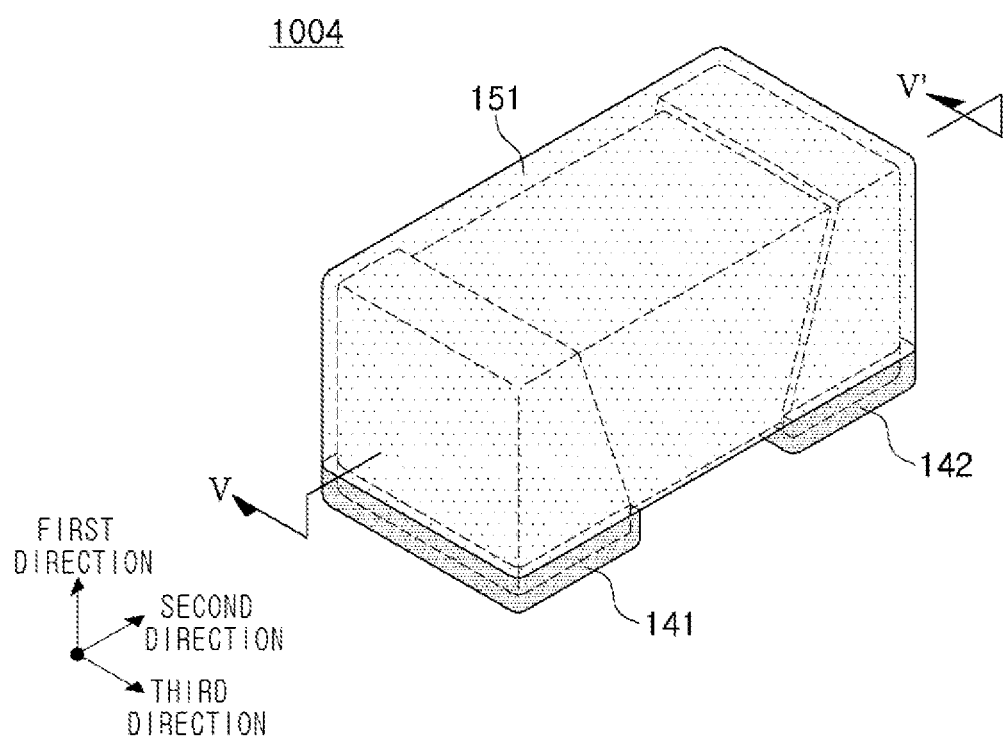
FIG. 12 is a schematic perspective view of a multilayer electronic component according to an embodiment of the present disclosure.
Figure 13:
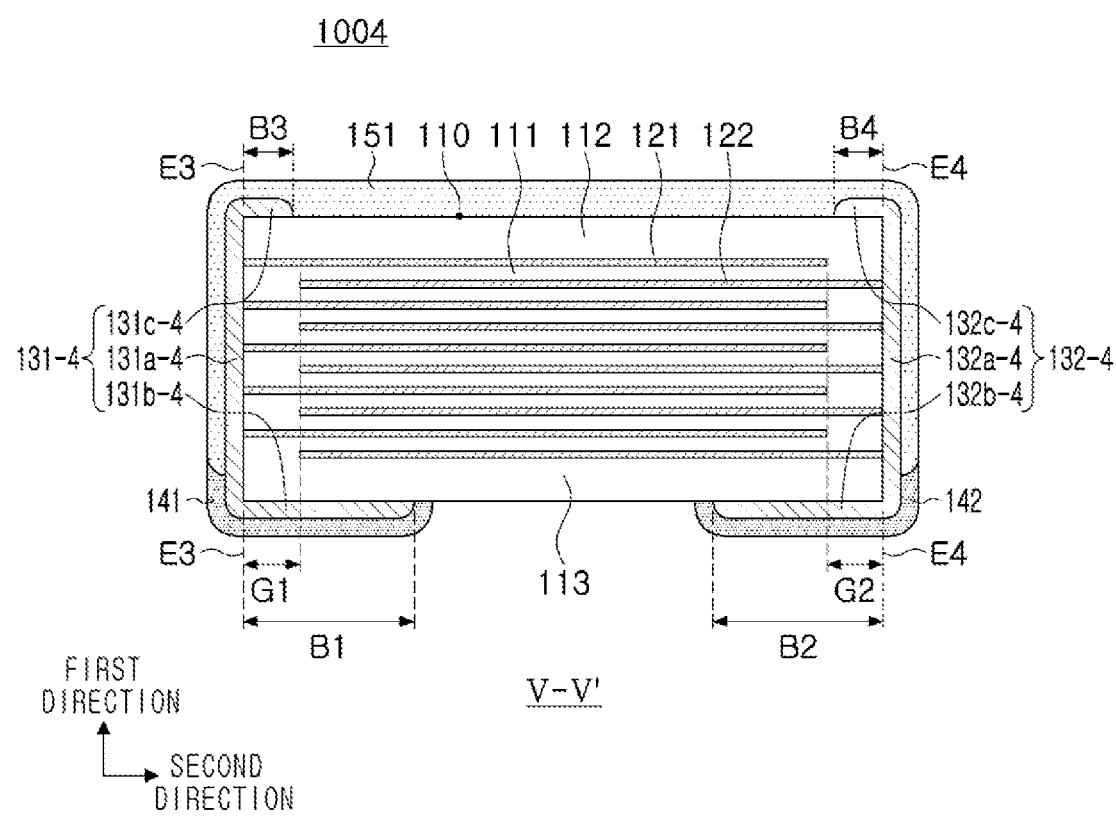
FIG. 13 is a cross-sectional view taken along line V-V' of FIG. 12.

FIG. 12 is a schematic perspective view of a multilayer electronic component 1004 according to an exemplary embodiment in the present disclosure. FIG. 13 is a cross-sectional view taken along line V-V' of FIG. 12.

Referring to FIGS. 12 and 13, in the multilayer electronic component 1004 according to an embodiment, an average length "B1" of a first band portion 131*b*-4 may be greater than an average length "B3" of a third band portion 131*c*-4, and an average length "B2" of a second band portion 132*b*-4 may be greater than an average length "B4" of a fourth band portion 132*c*-4. Accordingly, an area in contact with a solder during mounting may be increased to improve adhesion strength.

In more detail, when an average size from an extension line E3 of a third surface 3 to an end of the first band portion 131*b*-4 in the second direction is B1, an average size from an extension line E4 of the fourth surface 4 to an end of the second band portion 132*b*-4 in the second direction is B2, an average size from the extension line E3 of the third surface 3 to an end of the third band portion 131*c*-4 in the second direction is B3, and an average size from the extension line E4 of the fourth surface 4 to an end of the fourth band portion 132*c*-4 in the second direction is B4, B3<B1 and B4<B2 may be satisfied.

In this case, when an average size of the body 110 in the second direction is L, $0.2 \leq B1/L \leq 0.4$ and $0.2 \leq B2/L \leq 0.4$ may be satisfied.

The average sizes "B1," "B2," "B3," "B4," and "L" may be values obtained by averaging values measured at five points at equal intervals, in a third direction, in a cross-section of the body 110 taken in first and second directions (an L-T cross-section).

In addition, the first external electrode 131-4 may include a first side band portion extending from the first connection portion 131*a*-4 onto a portion of the fifth and sixth surfaces 5 and 6, and the second external electrode 132-4 may include a second side band portion extending from the second connection portion 132*a*-4 onto a portion of the fifth and sixth surfaces 5 and 6. In this case, sizes of the first and second side band portions in the second direction may be gradually increased in a direction toward the first surface 1. That is, the first and second side band portions may be disposed to have a tapered shape or a trapezoidal shape.

Furthermore, when an average size from an extension line E3 of the third surface 3 to an end of the third band portion 131*c*-4 in the second direction is B3, an average size from an extension line E4 of the fourth surface 3 to an end of the fourth band portion 132*c*-4 in the second direction is B4, an average size of a region, in which the third surface 3 and the second internal electrode 122 are spaced apart from each other, in the second direction is G1, an average size of a region, in which the fourth surface 4 and the first internal electrode 121 are spaced apart from each other, in the second direction is G2, B3≤G1 and B4≤G2 may be satisfied. Accordingly, a volume occupied by an external electrode may be significantly reduced to increase capacitance per unit volume of the multilayer electronic component 1004.

The average sizes "G1" and "G2" may be values obtained by averaging values measured at five points at equal intervals, in the third direction, in a cross-section of the body 110 taken in the first and second directions (an L-T cross-section). The average size "G1" may be a value obtained by averaging sizes spaced apart from the third surface in the second direction and measured with respect to five arbitrary second internal electrodes disposed in a central portion in the first direction, and the average size "G2" may be a value obtained by averaging sizes of regions, spaced apart from the fourth surface measured with respect to five arbitrary first internal electrodes disposed in the central portion in the first direction, in the second direction.

Furthermore, the average sizes "G1" and "G2" may be obtained at five points at equal intervals, in the third direction, in a cross-section of the body 110 taken in first and second directions (an L-T cross-section), and an average value of the average sizes "G1" and "G2" may be further generalized.

However, the present disclosure does not intend to be limited to B3 G1 and B4 G2, and a case in which B3 G1 and B4 G2 may be included as an embodiment. Therefore, in an embodiment, when an average size from an extension line E3 of the third surface 3 to an end of the third band portion 131c-4, in the second direction is B3, an average size from an extension line E4 of the fourth surface 4 to an end of the fourth band portion 132c-4, in the second direction is B4, an average of a region, in which the third surface 3 and the second internal electrode 122 are spaced apart from each other, in the second direction is G1, and an average size of a region, in which the fourth surface 4 and the first internal electrode 121 are spaced apart from each other, in the second direction is G2, B3≥G1 and B4≥G2 may be satisfied.

In an embodiment, when an average size from an extension line E3 of the third surface to an end of the first band portion in the second direction is B1, and an average size from an extension line E4 of the fourth surface to an end of the second band portion in the second direction is B2, B1≥G1 and B2≥G2 may be satisfied. Accordingly, adhesion strength between the multilayer electronic component 1004 and a substrate 180 may be improved.

Figure 14:
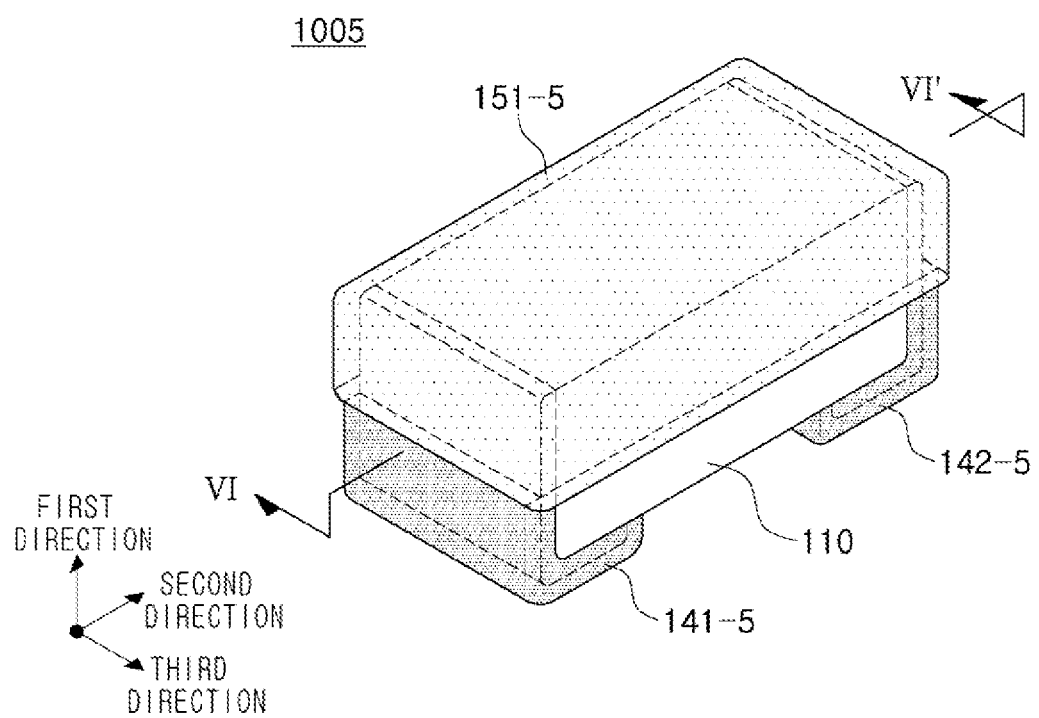
FIG. 14 is a schematic perspective view of a multilayer electronic component according to an embodiment of the present disclosure.
Figure 15:
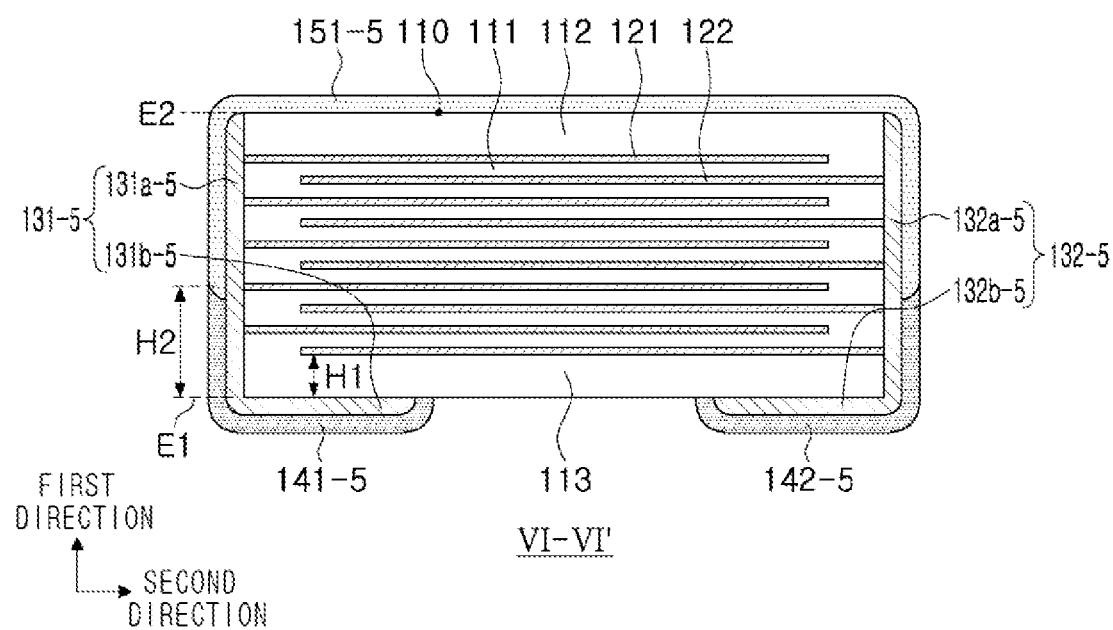
FIG. 15 is a cross-sectional view taken along line VI-VI' of FIG. 14.
Figure 16:
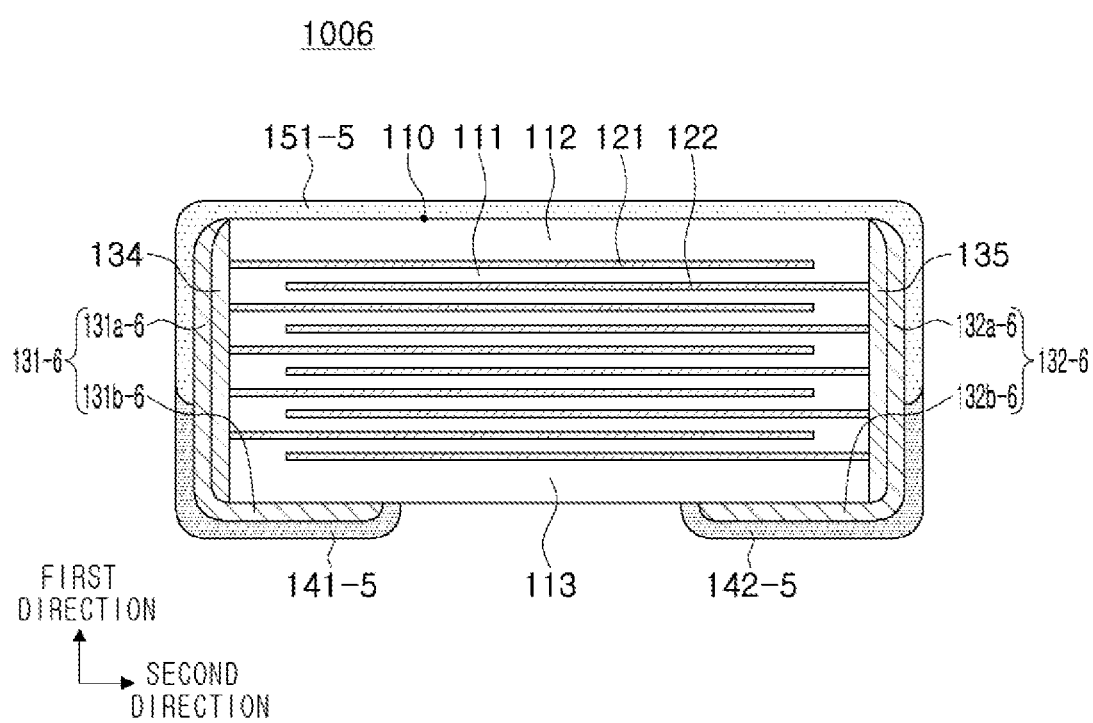
FIG. 16 is a view illustrating a modified example of FIG. 14.

FIG. 14 is a schematic perspective view of a multilayer electronic component 1005 according to an embodiment of the present disclosure. FIG. 15 is a cross-sectional view taken along line VI-VI' of FIG. 14. FIG. 16 is a view illustrating a modified example of FIG. 14.

Referring to FIGS. 14 and 15, first and second external electrodes 131-5 and 132-5 of the multilayer electronic component 1005 according to an embodiment may not be disposed on a second surface and may be disposed third, fourth, and first surfaces to have an L-shape. That is, the first and second external electrodes 131-5 and 132-5 may be disposed on a level the same or lower than a level of an extension line of the second surface.

The first external electrode 131-5 may include a first connection portion 131a-5, disposed on the third surface 3, and a first band portion 131b-5 extending from the first connection portion 131a-5 onto a portion of the first surface 1. The second externa electrode 132-5 may include a second connection portion 132a-5, disposed on the fourth surface 4, and a second band portion 132b-5 extending from the second connection portion 132a-5 onto a portion of the first surface 1. The external electrodes 131-5 and 132-5 may not be disposed on the second surface 2, so that an insulating layer 151-5 may be disposed to cover an entirety of second surface 2. Accordingly, a volume occupied by the external electrodes 131-5 and 132-5 may be significantly reduced to further improve capacitance per unit volume of the multilayer electronic component 1005. However, the insulating layer 151-5 is not limited to a form covering the entire second surface 2. The insulating layer may not cover a portion or an entity of the second surface 2, and may have a form divided into two insulating layers, respectively covering the first and second connection portions 131a-5 and 132a-5.

A first plating layer 141-5 may be disposed on a first band portion 131b-5, and a second plating layer 142-5 may be disposed on a second band portion 132b-5. The first and second plating layers 141-5 and 142-5 may be disposed to extend to a portion on the first and second connection portions 132a-5 and 132b-5.

In this case, the external electrodes 131-5 and 132-5 may not be disposed even on fifth and sixth surfaces 5 and 6. That is, the external electrodes 131-5 and 132-5 may be disposed on only the third, fourth, and first surfaces.

When an average size from a first surface 1 to an internal electrode, disposed to be closest to the first surface 1, among the first and second internal electrodes 121 and 122, in a first direction, is H1, and an average size from an extension line E1 of the first surface 1 to the plating layers 141-5 and 142-5, disposed on first and second connection portions 131a-5 and 132a-5, in the first direction is H2, H1<H2 may be satisfied. Accordingly, an area in contact with a solder during mounting may be increased to improve adhesion strength, and contact areas between external electrodes 131-5 and 132-5 and plating layers 141-5 and 142-5 may be increased to suppress an increase in equivalent series resistance (ESR).

More preferably, when an average size of the body 110 in the first direction is T, H2<T/2 may be satisfied. That is, H1<H2<T/2 may be satisfied. This is because when "H2" is greater than or equal to T/2, an effect of improving moisture resistance reliability by an insulating layer may be decreased.

In addition, the first and second plating layers 141-5 and 142-5 may be disposed to cover a portion of the insulating layer 151-1 on the third and fourth surfaces. That is, the plating layers 141-5 and 142-5 may be disposed to cover an end of the insulating layer 151-5 on the third and fourth surfaces. Accordingly, bonding strength between the insulating layer 151-5 and the plating layers 141-5 and 142-5 may be increased to improve reliability of the multilayer electronic component 1005.

In addition, the insulating layer 151-5 may be disposed to cover portions of the first and second plating layers 141-5 and 142-5 on the third and fourth surfaces. That is, the insulating layer 151-5 may be disposed to cover ends of the plating layers 141-5 and 142-5 on the third and fourth surfaces. Accordingly, the adhesion between the insulating layer 151-5 and the plating layers 141-5 and 142-5 may be increased to improve the reliability of the multilayer electronic component 1005.

FIG. 16 illustrates a modified example of FIG. 14. Referring to FIG. 16, in a modified example 1006 of the multilayer electronic component 1005 according to an embodiment, a first additional electrode layer 134 may be disposed between a first connection portion 131a-6 and a third surface and a second additional electrode layer 135 may be disposed between a second connection portion 132a-6 and a fourth surface. The first additional electrode layer 134 may be disposed within a range that are not outside the third surface, and the second additional electrode layer 135 may be disposed within a range that are not outside the fourth surface. The first and second additional electrode layers 134 and 135 may improve electrical connectivity between internal electrodes 121 and 122 and external electrodes 131-6 and 132-6, and may have improved bonding strength with the external electrodes 131-6 and 132-6 to serve to further improve mechanical bonding strength between the external electrodes 131-6 and 132-6.

The first and second external electrodes 131-6 and 132-6 may have an L-shape in which first and second external electrodes are not disposed on a second surface.

The first external electrode 131-6 may include a first connection portion 131a-6, disposed on the first additional electrode layer 134, and a first band portion 131b-6 extending from the first connection portion 131a-6 onto a portion of the first surface 1. The second external electrode 132-6 may include a second connection portion 132a-6, disposed on the second additional electrode layer 135, and a second band portion 132b-6 extending from 132a-6 onto a portion of the first surface 1.

Meanwhile, the first and second additional electrode layers 131-6 and 132-6 may be formed of any material such as a metal as long as it has electrical conductivity, and a specific material may be determined in consideration of electrical characteristics and structural stability. In addition, the first and second additional electrode layers 131-6 and 132-6 may be sintered electrodes including a conductive metal and glass, or resin-based electrodes including a conductive metal and a resin. In addition, the first and second additional electrode layers 131-6 and 132-6 may be formed by transferring a sheet, including a conductive metal, to a body.

As the conductive metal included in the first and second additional electrode layers 131-6 and 132-6, a material having improved electrical conductivity may be used, but is not particularly limited. For example, the conductive metal may be at least one of Cu, Ni, Pd, Ag, Sn, Cr, and alloys thereof. Preferably, the first and second additional electrode layers 131-6 and 132-6 may include at least one of Ni and a Ni alloy, and accordingly, the connectivity with the internal electrodes 121 and 122 including Ni can be further improved.

Figure 17:
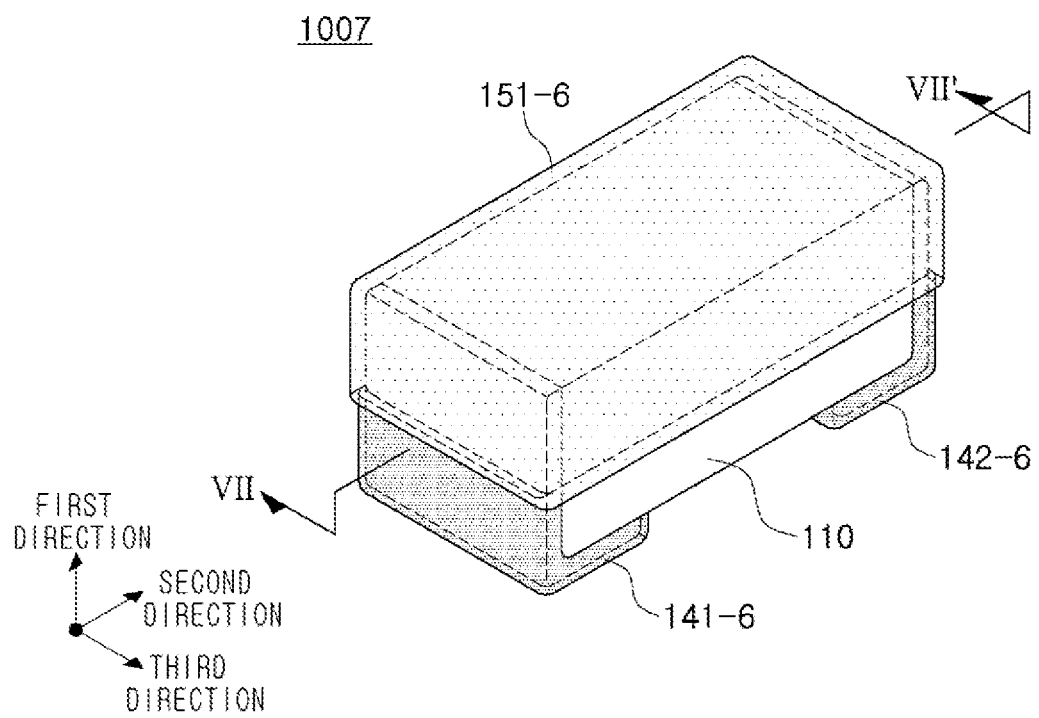
FIG. 17 is a schematic perspective view of a multilayer electronic component according to an embodiment of the present disclosure.

FIG. 17 is a schematic perspective view of a multilayer electronic component 1007 according to an embodiment of the present disclosure, and FIG. 1'8 is a cross-sectional view taken along line VII-VII' of FIG. 17.

Figure 18:
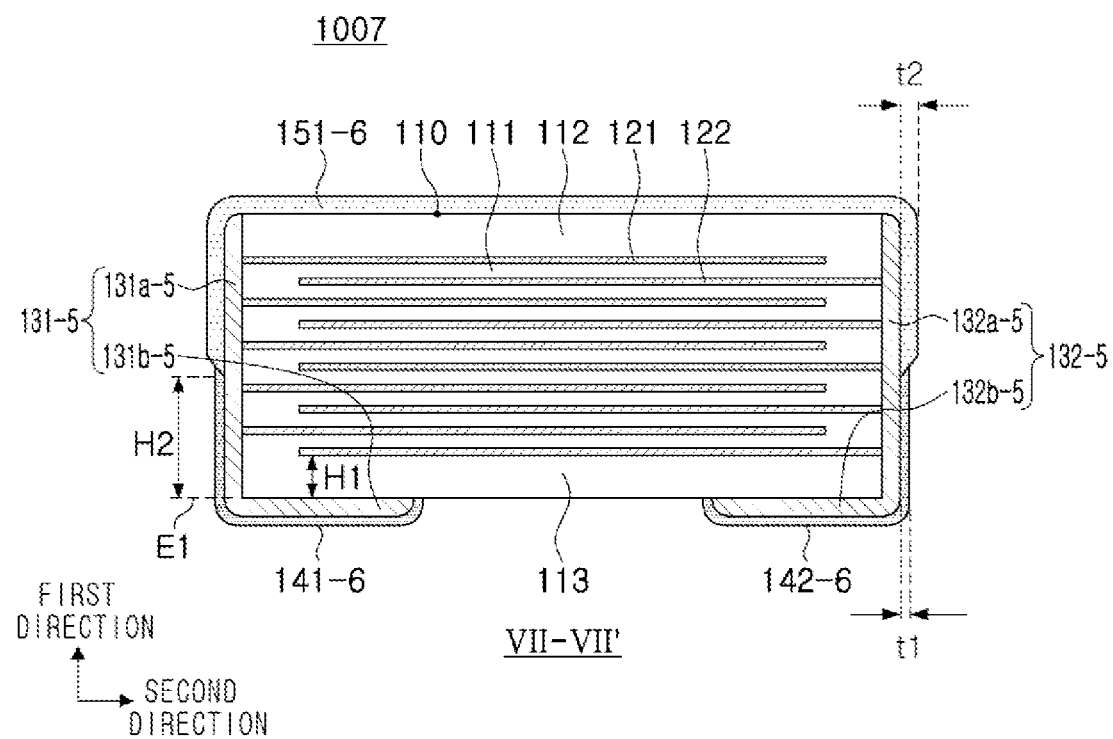
FIG. 18 is a cross-sectional view taken along line VII-VII' of FIG. 17.

Referring to FIGS. 17 and 18, an average thickness (t1) of first and second plating layers 141-6 and 142-6 of the multilayer electronic component 1007 according to an embodiment of the present disclosure may be thinner than an average thickness (t2) of an insulating layer 151-6.

The insulating layer 151-6 serves to prevent permeation of external moisture or permeation of a plating solution, but may have weak connectivity with the plating layers 141-6 and 142-6, to cause delamination of the plating layers 141-6 and 142-6. When the plating layer is delaminated, adhesion strength to a substrate 180 may be reduced. The "delamination of the plating layers 151-6 and 152-6" may mean that a plating layer is partially removed or is physically separated from the external electrodes 131-5 and 132-5. Since connectivity between a plating layer and an insulating layer is weak, there is high possibility that a gap at an interface between the insulating layer and the plating layer may be increased or foreign objects may permeate through the gap, and there is high possibility that the plating layer may be delaminated due to vulnerability to external impacts, or the like.

According to an embodiment, the plating layer may be formed to have the average thickness "t1" smaller than the average thickness "t2" of the insulating layer, so that a contact area between the plating layer and the insulating layer may be reduced. Thus, occurrence of delamination may be suppressed to improve adhesion strength to the substrate 180 of the multilayer electronic component 1000.

The average thickness "t1" of the first and second plating layers 141-6 and 142-6 may be an average value of thicknesses measured at five points disposed at equal intervals on first and second connection portions 131a-5 and 132a-5 or first and second band portions 131b-5 and 132b-5, and the average thickness "t2" of the insulating layer 151-6 may be an average value of thicknesses measured at five points disposed at equal intervals on the first and second connection portions 131a-5 and 132a-5.

Figure 19:
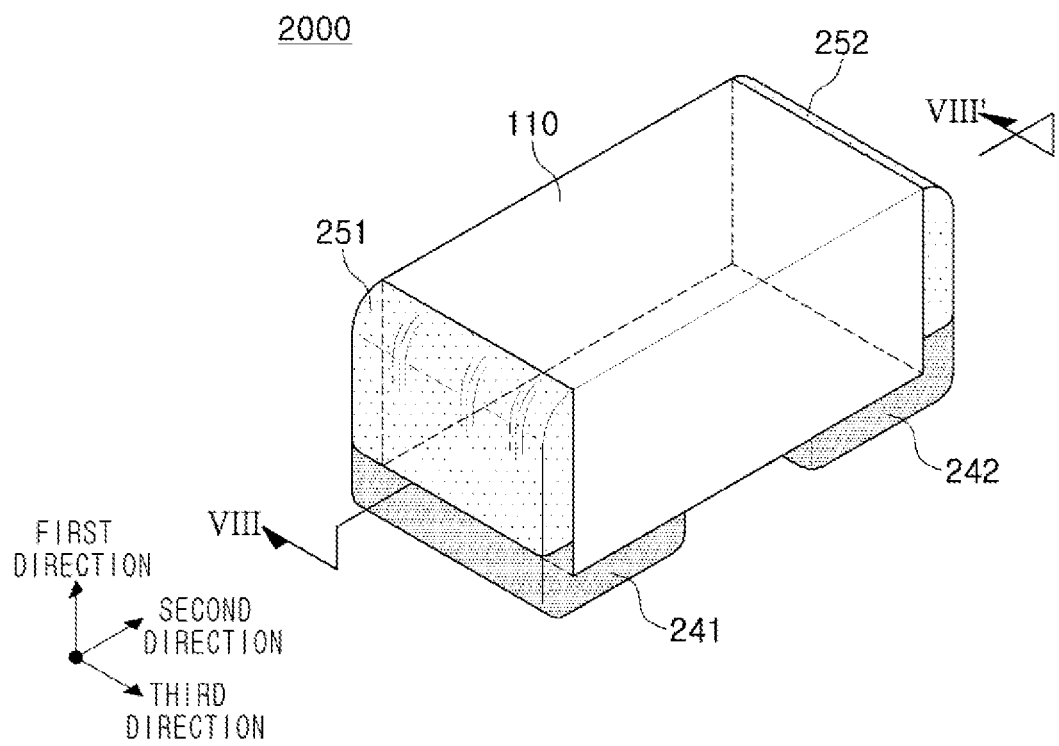
FIG. 19 is a schematic perspective view of a multilayer electronic component according to an embodiment of the present disclosure.
Figure 20:
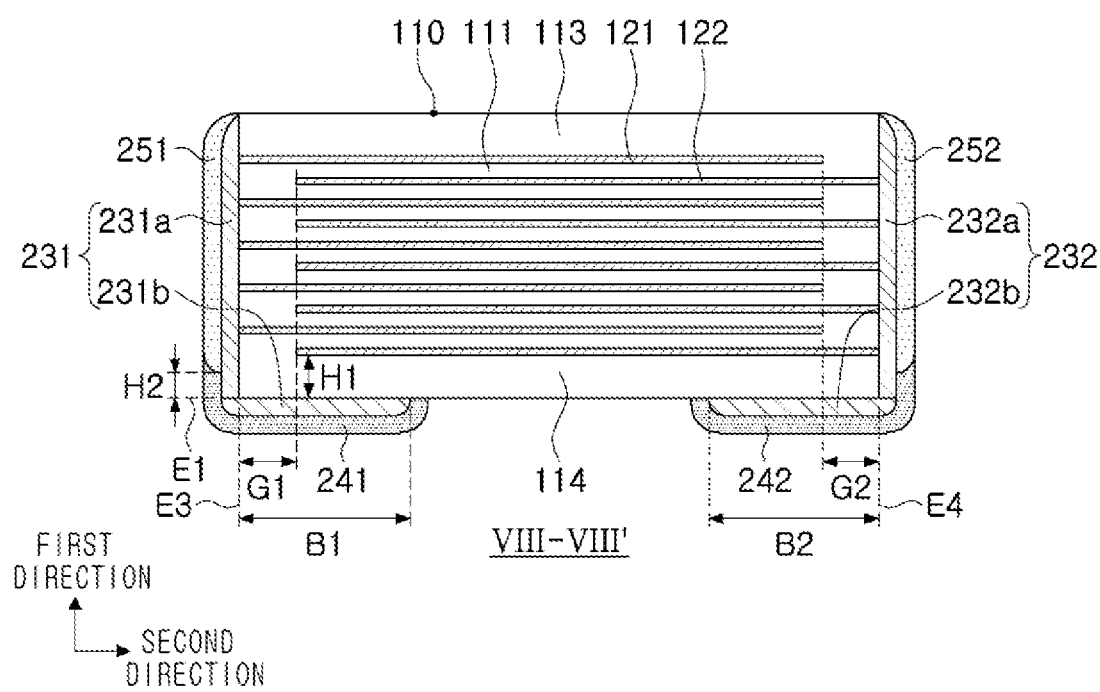
FIG. 20 is a cross-sectional view taken along line VIII-VIII' of FIG. 19.

FIG. 19 is a schematic perspective view of a multilayer electronic component 2000 according to an embodiment of the present disclosure. FIG. 20 is a cross-sectional view taken along line VIII-VIII' of FIG. 19.

Hereinafter, a multilayer electronic component 2000 according to an embodiment will be described in detail with reference to FIGS. 19 and 20. However, descriptions of the configurations overlapping with those described in the above-described multilayer electronic component will be omitted to avoid overlapping descriptions.

The multilayer electronic component 2000 according to an embodiment of the present disclosure may include: a body 110 including a dielectric body 111 and first and second internal electrodes 121 and 122 alternately disposed with the dielectric layer 111 interposed therebetween, the body 110 having first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction; a first external electrode 231 including a first connection electrode 231a disposed on the third surface 3 and a first band electrode 231b disposed on the first surface 1 and connected to the first connection electrode 231a; a second external electrode 232 including a second connection electrode 232a disposed on the fourth surface 4 and a second band electrode 232b disposed on the first surface 1 and connected to the second connection electrode 232a; a first insulating layer 251 disposed on the first connection electrode 231a; a second insulating layer 252 disposed on the second connection electrode 232a; a first plating layer 241 disposed on the first band electrode 231b; and a second plating layer 242 disposed on the second band electrode 232b. The first and second insulating layers 251 and 252 may include an oxide containing Ti, and the dielectric layer includes one of $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) and $Ba(Ti_{1-y}Zr_y)O_3$ ($0<y<1$) as a main component.

The first connection electrode 231a may be disposed on the third surface 3 to be connected to the first internal electrode 121, and the second connection electrode 231b may be disposed on the fourth surface 4 to be connected to the second internal electrode 122. In addition, a first insulating layer 251 may be disposed on the first connection electrode 231a, and a second insulating layer 252 may be disposed on the second connection electrode 232a.

In the related art, a method of dipping a surface, on which an internal electrode of a body is exposed, into a paste including a conductive metal has been mainly used when forming an external electrode. However, in the external electrode formed by the dipping method, a thickness of a central portion in a thickness direction may be significantly large. In addition to a thickness imbalance issue of the external electrode according to the dipping method, due to exposure of internal electrodes to third and fourth surface of the body, each of the external electrodes disposed on the third and fourth surfaces may be formed to have a thickness, greater than or equal to a predetermined thickness, to suppress permeation of moisture and a plating solution through the external electrodes.

On the other hand, in the present disclosure, the insulating layers 251 and 252 are disposed on connection electrodes 231a and 232a, so that sufficient reliability may be secured even when the connection electrodes 231a and 232a are formed to be thin on the third and fourth surfaces on which internal electrodes are exposed.

The first and second connection electrodes 231a and 232a may have a shape corresponding to the third and fourth surfaces 3 and 4, respectively, and a surface directed toward the body 110 from the first and second connection electrodes 231a and 232a may have the same area as each of the third and fourth surfaces 3 and 4 of the body 110. The first and second connection electrodes 231a and 232a may be disposed within a range that is not outside the third and fourth surfaces 3 and 4, respectively. The connection electrodes 231a and 232a may be disposed to not extend to the first, second, fifth, and sixth surfaces 1, 2, 5, and 6 of the body 110. Specifically, in an embodiment, the first and second connection electrodes 231a and 232a may be disposed to be spaced apart from the fifth and sixth surfaces 5 and 6. Accordingly, a volume occupied by the external electrodes may be significantly reduced to further increase capacitance per unit volume of the multilayer electronic component 2000 while securing sufficient connectivity between the internal electrodes 121 and 122 and the external electrodes 231 and 232.

In this regard, the first and second connection electrodes 231a and 232a may be disposed to be spaced apart from the second surface 2. That is, as the external electrodes 231 and 232 are not disposed on the second surface 2, a volume occupied by the external electrodes 231 and 232 may be further significantly decreased to further increase capacitance per unit volume of the multilayer electronic component 2000.

However, the connection electrodes 231a and 232a may include a corner portion extending to a corner of the body 110 to be disposed on the corner. That is, in an embodiment, the first connection electrode may include a corner portion disposed to extend onto the 1-3 corner and the 2-3 corner, and the second connection electrode may include a corner portion disposed to extend onto the 1-4 corner and the 2-4 corner.

In addition, the connection electrodes 231a and 232a may have a uniform and thin thickness compared to an external electrode formed by a dipping method according to the related art.

A method of forming the connection electrodes 231a and 232a does not need to be limited. For example, the connection electrodes 231a and 232a may be formed by transferring a sheet, including organic materials such as a conductive metal and a binder, to the third and fourth surfaces 3 and 4.

A thickness of each of the connection electrodes 231a and 232a is not particularly limited, but may be, for example, 2 to 7 μm. The thickness of each of the connection electrodes 231a and 232a may refer to a maximum thickness thereof, and may refer to a size of each of the connection electrodes 231a and 232a in a second direction.

In an embodiment, the first and second connection electrodes 231a and 232a may include the same metal and glass as those included in the internal electrodes 121 and 122. As the first and second connection electrodes 231a and 232a include the same metal as the metal included in the internal electrodes 121 and 122, electrical connectivity to the internal electrodes 121 and 122 may be improved. In addition, as the first and second connection electrodes 231a and 232a include glass, bonding strength with the body 110 and/or the insulating layers 251 and 252 may be improved. In this case, the same metal as the metal included in the internal electrodes 121 and 122 may be nickel (Ni).

The first and second insulating layers 251 and 252 may be respectively disposed on the first and second connection electrodes 231a and 232a to serve to prevent a plating layer from being formed on the first and second connection electrodes 231a and 232a. In addition, the first and second insulating layers 251 and 252 may serve to improve sealing characteristics to significantly reduce permeation of external moisture or a plating solution.

The first and second insulating layers 251 and 252 may include an oxide containing Ti. By applying an oxide containing Ti instead of a glass-based oxide to the first and second insulating layers 251 and 252, moisture resistance reliability may be further improved, cracks due to thermal contraction, radiation cracks due to metal diffusion, and the like may be suppressed.

The first and second band electrodes 231b and 232b may be disposed on the first surface 1 of the body 110. The first and second band electrodes 231b and 232b may be in contact with the first and second connection electrodes 231a and 232a, respectively, to be electrically connected to the first and second internal electrodes 121 and 122, respectively.

An external electrode formed by the dipping method according to the related art may have a large thickness on third and fourth surfaces and may partially extend to the first, second, fifth and sixth surfaces, so that it may be difficult to secure a high effective volume ratio.

On the other hand, according to an embodiment of the present disclosure, the first and second connection electrodes 231a and 232a may be disposed on a surface, on which internal electrodes are exposed, and the first and second band electrodes 231b and 232b may be disposed on a surface mounted on a substrate, so that a high effective volume ratio may be secured.

Meanwhile, when the internal electrodes 121 and 122 are laminated in a first direction, the multilayer electronic component 2000 may be horizontally mounted on a substrate such that the internal electrodes 121 and 122 are parallel to a mounting surface. However, the present disclosure is not limited to the case in which the multilayer electronic component 2000 is horizontally mounted, and when the internal electrodes 121 and 122 are laminated in a third direction, the multilayer electronic component 2000 may be vertically mounted on the substrate such that the internal electrodes 121 and 122 are perpendicular to the mounting surface.

The first and second band electrodes 231b and 232b may be formed of any material such as a metal as long as it has electrical conductivity, and a specific material may be determined in consideration of electrical characteristics and structural stability. For example, the first and second band electrodes 231 and 232b may be sintered electrodes including a conductive metal and glass, and may be formed using a method of applying a paste, including a conductive metal and glass, on the first surface of the body. However, embodiments are not limited thereto, and each of the first and second band electrodes 231 and 232b may be a plating layer formed by plating a conductive metal on the first surface of the body.

As the conductive metal included in the first and second band electrodes 231b and 232b, a material having improved electrical conductivity may be used, and is not particularly limited. For example, the conductive metal may be at least one of nickel (Ni), copper (Cu), and alloys thereof, and may include the same metal as the metal included in the internal electrodes 121 and 122.

Meanwhile, in an embodiment, the first external electrode 231 may further include a third band electrode (not illustrated) disposed on the second surface 2 and connected to the first connection electrode 231a, and the second external electrode 232 may further include a fourth band electrode (not illustrated) disposed on the second surface 2 and connected to the second connection electrode 232a.

In an embodiment, when a distance from an extension line E3 of the third surface 3 to an end of the first band electrode 231b is B1, a distance from an extension line E4 of the fourth surface 4 to an end of the second band electrode 232b is B2, a distance from the extension line E3 of the third surface 3 to an end of the third band electrode (not illustrated) is B3, a distance from the extension line E4 of the fourth surface 4 to an end of the fourth band electrode (not illustrated) is B4, an average size of a region, in which the third surface 3 and the second internal electrode 122 are spaced apart from each other in a second direction is G1, and an average size of a region, in which the fourth surface 4 and the first internal electrode 121 are spaced apart from each other in a second direction is G2, B1≥G1, B3≥G1, B2≥G2 and B4≥G2 may be satisfied. Accordingly, a volume occupied by the external electrode may be significantly reduced to increase capacitance per unit volume of the multilayer electronic component 2000 and to increase an area in contact with the solder during mounting, resulting in improved adhesion strength.

However, the present disclosure does not intend to be limited to disclosure to B1≥G1, B3≤G1, B2≥G2 and B4≤G2, and a case in which B1≥G1, B3≥G1, B2≥G2 and B4≥G2 may be included as an embodiment of the present disclosure. Accordingly, in an embodiment, when a distance from an extension line E3 of the third surface 3 to an end of the first band electrode 231b is B1, a distance from an extension line E4 of the fourth surface 4 to an end of the second band electrode 232b is B2, a distance from the extension line E3 of the third surface 3 to an end of the third band electrode (not illustrated) is B3, a distance from the extension line E4 of the fourth surface 4 to an end of the fourth band electrode (not illustrated) is B4, an average size of a region, in which the third surface 3 and the second internal electrode 122 are spaced apart from each other in a second direction is G1, and an average size of a region, in which the fourth surface 4 and the first internal electrode 121 are spaced apart from each other in a second direction is G2, B1≥G1, B3≥G1, B2≥G2 and B4≥G2 may be satisfied. Accordingly, one of the first and second surfaces may be used as the mounting surface, so that ease of mounting may be improved.

The first and second plating layers 241 and 242 may be disposed on the first and second band electrodes 231b and 232b. The first and second plating layers 241 and 242 serve to improve mounting characteristics. The types of the first and second plating layers 241 and 242 are not limited, and each of the first and second plating layers 241 and 242 may be a plating layer including at least one of Ni, Sn, Pd, and alloys thereof, and may include a plurality of layers.

As a more specific example of the first and second plating layers 241 and 242, each of the first and second plating layers 241 and 242 may be a Ni plating layer or a Sn plating layer, and the first and second plating layers 241 and 242 may have a form in which a Ni plating layer and a Sn plating layer are sequentially formed on the first and second band electrodes 231b and 232b.

In an embodiment, the first and second plating layers 241 and 242 may be disposed to extend to partially cover the first and second connection electrodes 231a and 232a, respectively.

When an average size from a first surface 1 to an internal electrode disposed closest to the first surface 1, among the first and second internal electrodes 121 and 122, in a first direction is H1, and an average size from an extension line E1 of the first surface 1 to ends of first and second plating layers 241 and 242 disposed on the first and second connection electrodes 231a and 232a is H2, H1>H2 (or H1≥H2) may be satisfied. Accordingly, it is possible to suppress penetration of a plating solution into the internal electrode during a plating process, thereby improving reliability.

In an embodiment, the first and second insulating layers 251 and 242 may be disposed to be in direct contact with first and second connection electrodes 231a and 232a, respectively, and the first and second connection electrodes 231a and 232a may include a conductive metal and glass. Accordingly, since the plating layers 241 and 242 may not be disposed on a region in which the insulating layers 251 and 252 are disposed among outer surfaces of the first and second connection electrodes 231a and 232a, erosion of the external electrode by the plating solution can be effectively prevented.

In an embodiment, the first plating layer 241 may be disposed to cover an end of the first insulating layer 251 disposed on the first external electrode 231 of the first insulating layer 251, and the second plating layer 242 may be disposed to cover an end of the second insulating layer 252 disposed on the second external electrode 232 of the second insulating layer 252. Accordingly, reliability of the multilayer electronic component. 2000 may be improved by strengthening bonding strength between the insulating lavers 251 and 252 and the plating layers 241 and 242. In addition, by first forming the first and second insulating layers 251 and 252 before forming the plating layers 241 and 242 on the external electrodes 231 and 232, the penetration of the plating solution in a process of forming the plating layer may be more reliably suppressed. As the insulating layer is formed before the plating layer, the plating layers 241 and 242 may have a form covering ends of the insulating layers 251 and 252.

In an embodiment, the first insulating layer 251 may be disposed to cover an end of the first plating layer 241 disposed on the first external electrode 231, and the second insulating layer 252 may be disposed to cover an end of the second plating layer 242 disposed on the second external electrode 232. Accordingly, the reliability of the multilayer electronic component 2000 may be improved by strengthening the bonding strength between the insulating layer 251 and the plating layers 241 and 242.

Figure 21:
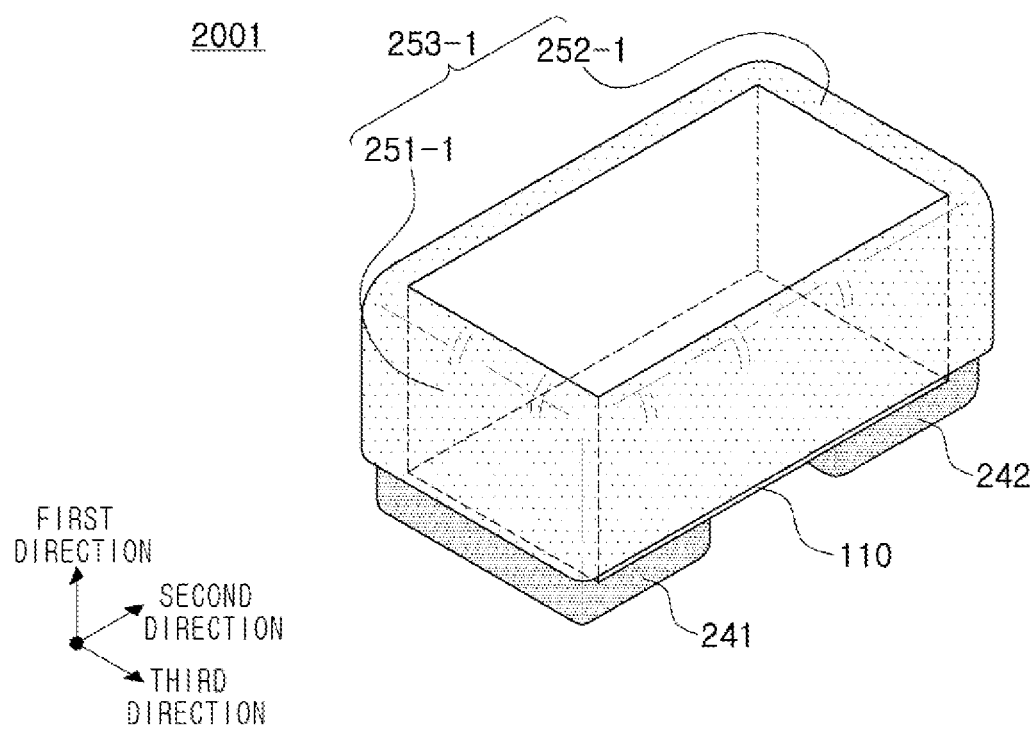
FIG. 21 is a view illustrating a modified example of FIG. 19.

FIG. 21 illustrates a modified example of FIG. 19. Referring to FIG. 21, in a modified example 2001 of the multilayer electronic component 2000 according to an embodiment of the present disclosure, first and second insulating layers 251-1 and 252-1 may extend to fifth and sixth surfaces 5 and 6 to be connected to each other to constitute a single insulating layer 253-1. In this case, the connected first and second insulating layer 253-1 may be disposed to cover portions of the fifth and sixth surfaces.

Figure 22:
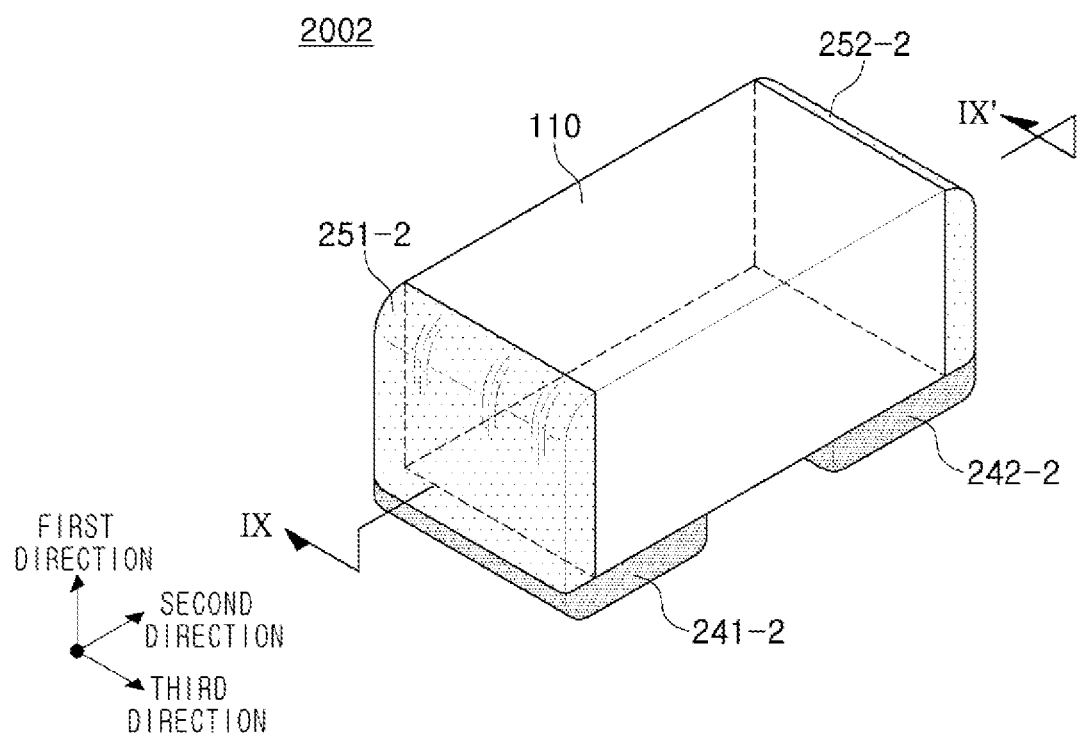
FIG. 22 is a schematic perspective view of a multilayer electronic component according to an embodiment of the present disclosure.
Figure 23:
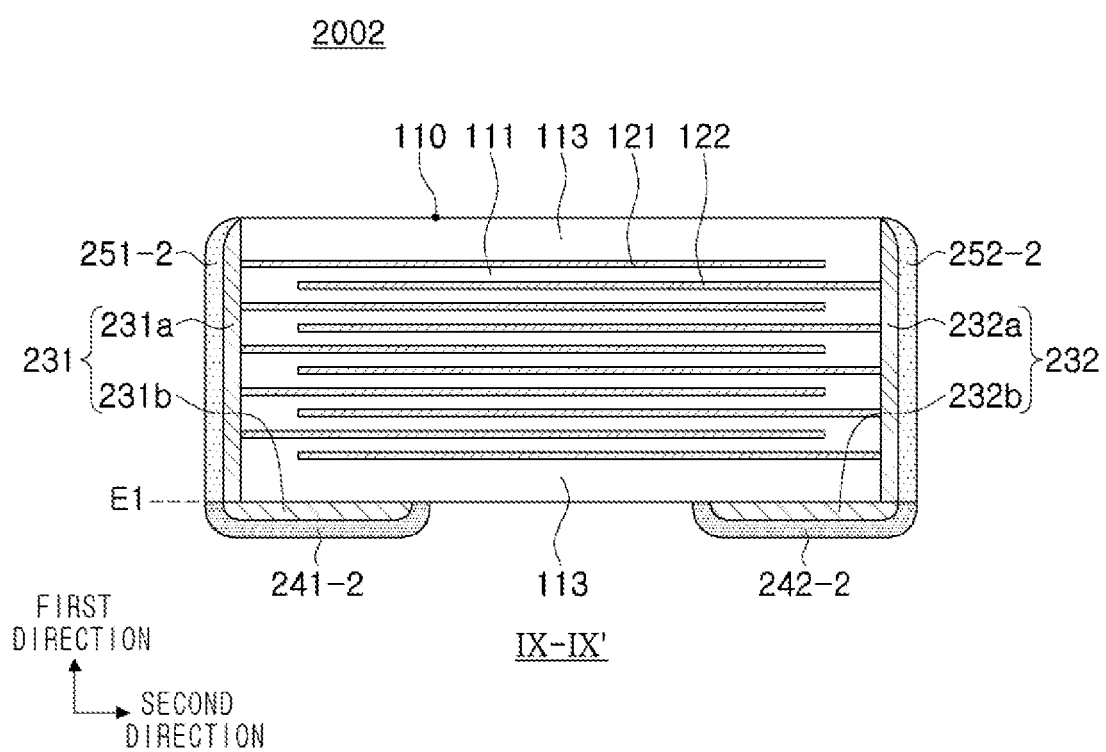
FIG. 23 is a cross-sectional view taken along line IX-IX' of FIG. 22.

FIG. 22 is a schematic perspective view of a multilayer electronic component 2002 according to an embodiment of the present disclosure. FIG. 23 is a cross-sectional view taken along line IX-IX' of FIG. 22.

Referring to FIGS. 22 and 23, in the multilayer electronic component 2002 according to an embodiment of the present disclosure, first and second plating layers 241-2 and 242-2 may be disposed on a level the same as or lower than a level of the extension line of the first surface. Accordingly, a height of a solder may be significantly reduced during mounting, and a mounting space may be significantly reduced.

In addition, the first and second insulating layers 251-2 and 252-2 may extend to the level the same as or lower than the extension line E1 of the first surface 1 to be in contact with the first and second plating layers 241-2 and 242-2.

Figure 24:
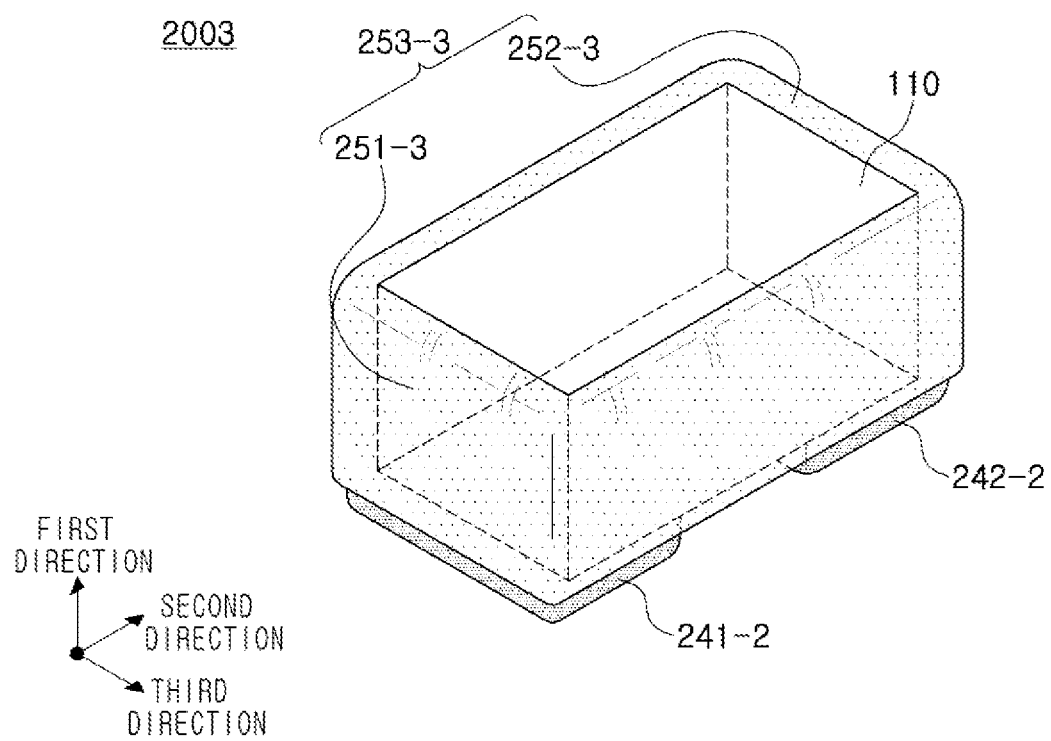
FIG. 24 is a view illustrating a modified example of FIG. 22.

FIG. 24 illustrates a modified example of FIG. 22. Referring to FIG. 24, in the multilayer electronic component 2002 according to an embodiment of the present disclosure, first and second insulating layers 251-3 and 252-3 may extend to fifth and sixth surfaces 5 and 6 to be connected to each other to constitute a single insulating layer 253-3. In this case, the connected first and second insulating layer 253-3 may be disposed to cover an entirety of the fifth and sixth surfaces.

Figure 25:
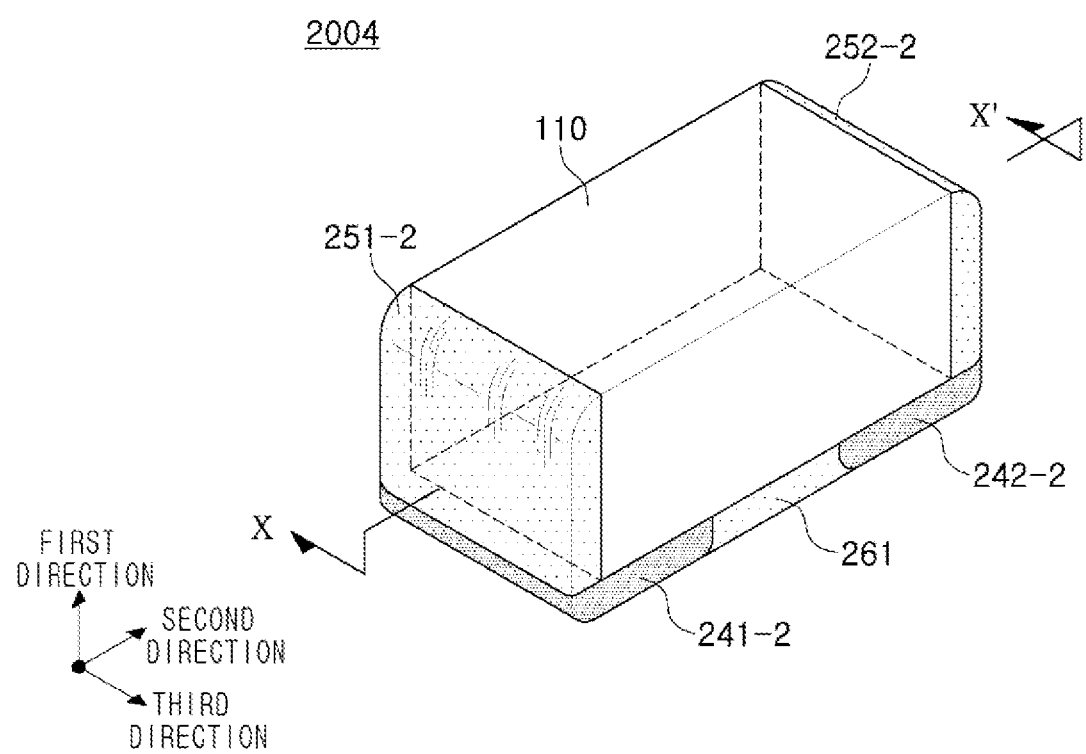
FIG. 25 is a schematic perspective view of a multilayer electronic component according to an embodiment of the present disclosure.

FIG. 25 is a schematic perspective view of a multilayer electronic component 2004 according to an embodiment of the present disclosure. FIC. 26 is a cross-sectional view taken along line X-X' of FIG. 25.

Figure 26:
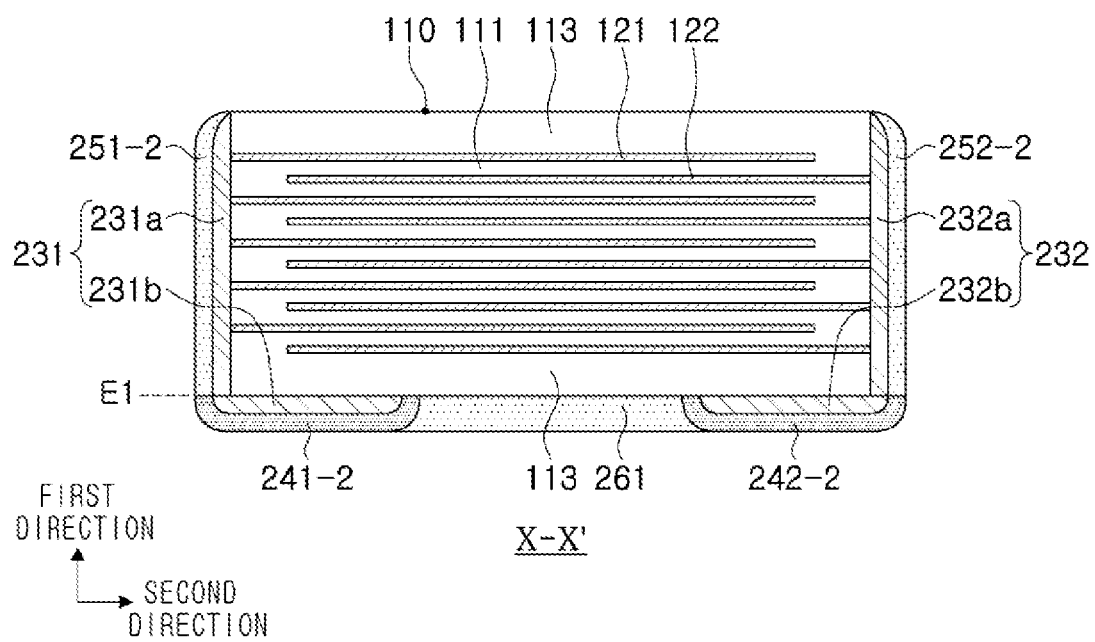
FIG. 26 is a cross-sectional view taken along line X-X' of FIG. 25.

Referring to FIGS. 25 and 26, the multilayer electronic component 2004 according to an embodiment of the present disclosure may further include an additional insulating layer 261 disposed on the first surface 1 and disposed between a first band electrode 231b and a second band electrode 232b. Accordingly, it is possible to prevent a leakage current, or the like, that may occur between the first band electrode 231b and the second band electrode 232b under a high voltage current.

The type of the additional insulating layer 261 does not need to be limited. For example, the additional insulating layer 261 may include an oxide containing Ti, like the first and second insulating layers 251-1 and 251-2, may include $TiO_2$, and may be $TiO_2$. However, it is not necessary to limit the additional insulating layer 261 and the first and second insulating layers 251-2 and 252-2 to be formed of the same material, and may be formed of different materials. For example, the additional insulating layer 261 may include at least one selected from an epoxy resin, an acrylic resin, ethyl cellulose, or the like, or may include glass.

Figure 27:
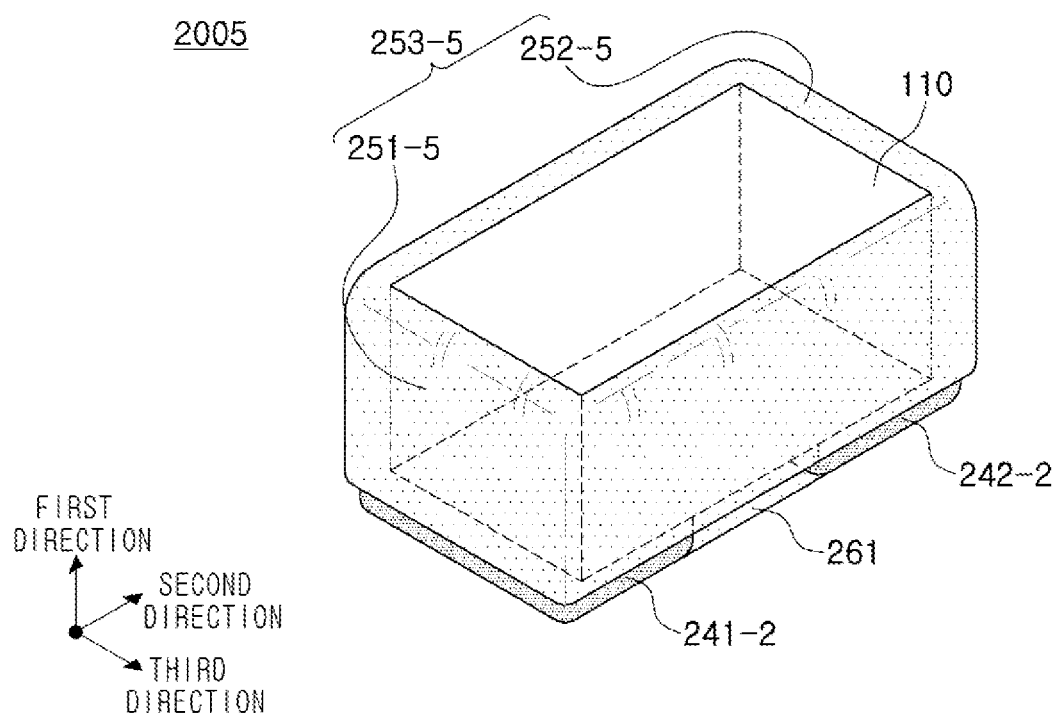
FIG. 27 is a view illustrating a modified example of FIG. 25.

FIG. 27 illustrates a modified example of FIG. 25. Referring to FIG. 27, in a modified example 2005 of the multilayer electronic component 2004 according to an embodiment of the present disclosure, first and second insulating layers 251-5 and 252-5 may extend to the fifth and sixth surfaces 5 and 6 to be connected to each other to constitute a single insulating layer 253-5.

Figure 28:
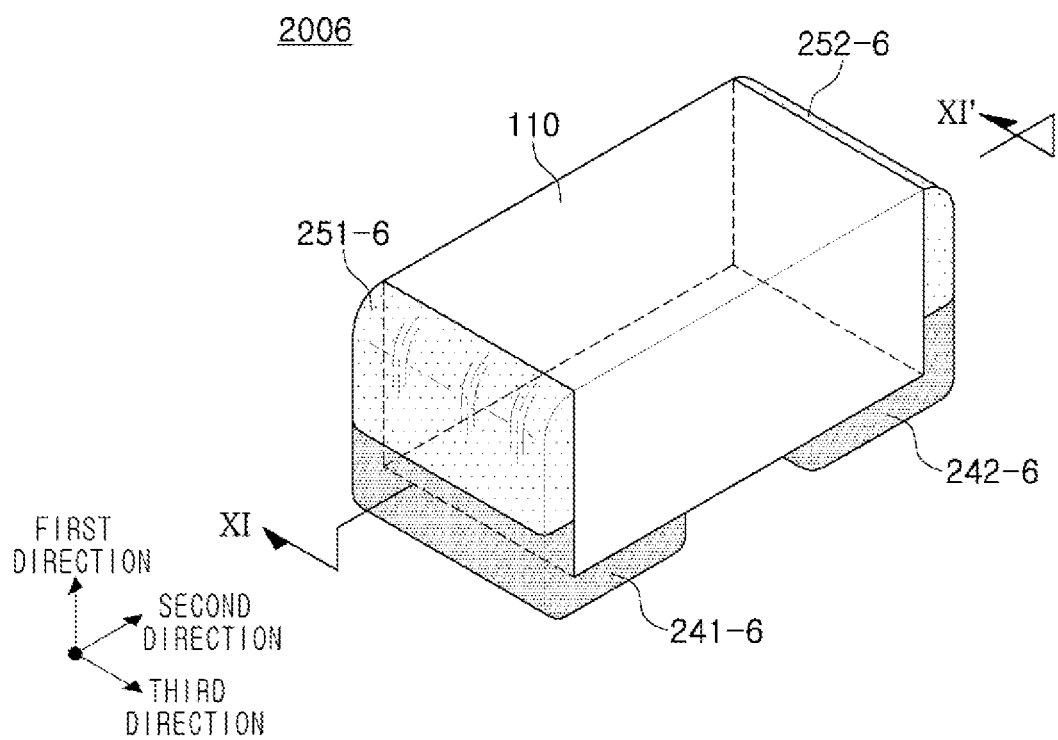
FIG. 28 is a schematic perspective view of a multilayer electronic component according to an embodiment of the present disclosure.
Figure 29:
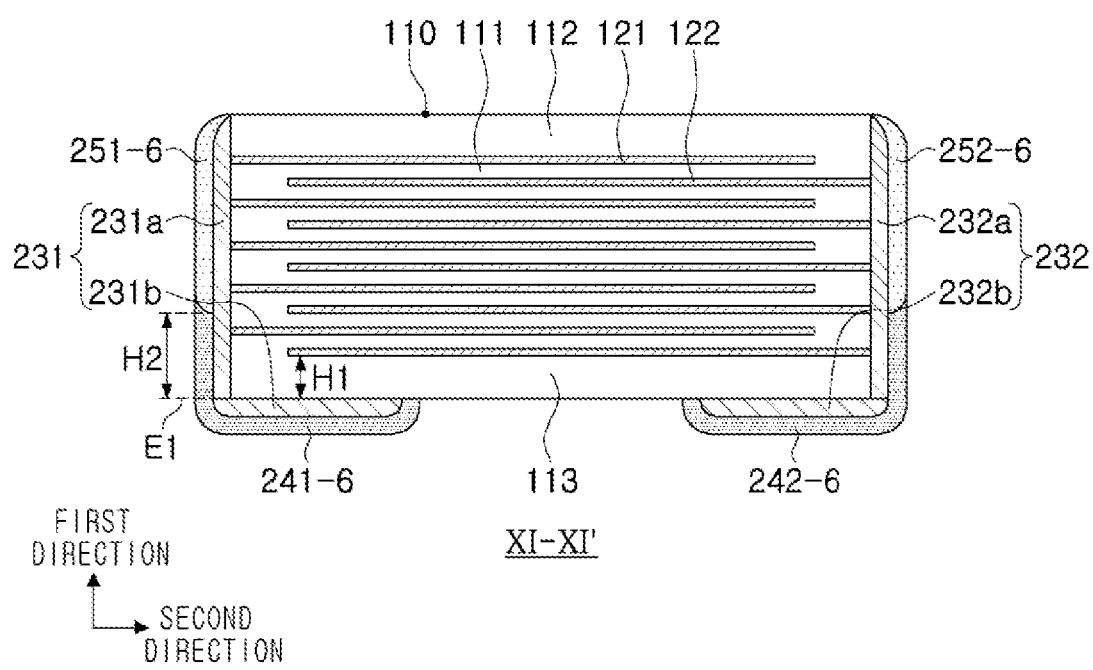
FIG. 29 is a cross-sectional view taken along line XI-XI' of FIG. 28.

FIG. 28 is a schematic perspective view of a multilayer electronic component 2006 according to an embodiment of the present disclosure. FIG. 29 is a cross-sectional view taken along line XI-XI' of FIG. 28.

Referring to FIGS. 28 and 29, the multilayer electronic component 2006 according to an embodiment may include a first insulating layer 251-6, disposed on a first connection electrode 231a, and a second insulating layer 252-6 disposed on a second connection electrode 232a, and when an average size from a first surface 1 to an internal electrode, disposed to be closest to the first surface 1, among the first and second internal electrodes 121 and 122, in a first direction is H1, and an average size from an extension line E1 of the first surface 1 to ends of plating layers 241-6 and 242-6 disposed on the first and second connection electrodes 231a and 232a, in the first direction is H2, H1<H2 may be satisfied. Accordingly, an area in contact with a solder during mounting may be increased to improve adhesion strength.

More preferably, when an average size of the body 110 in the first direction is T, H2<T/2 may be satisfied. That is, H1<H2<T/2 may be satisfied. This is because when H2 is greater than or equal to T/2, an effect of improving moisture resistance reliability by an insulating layer may be decreased.

Figure 30:
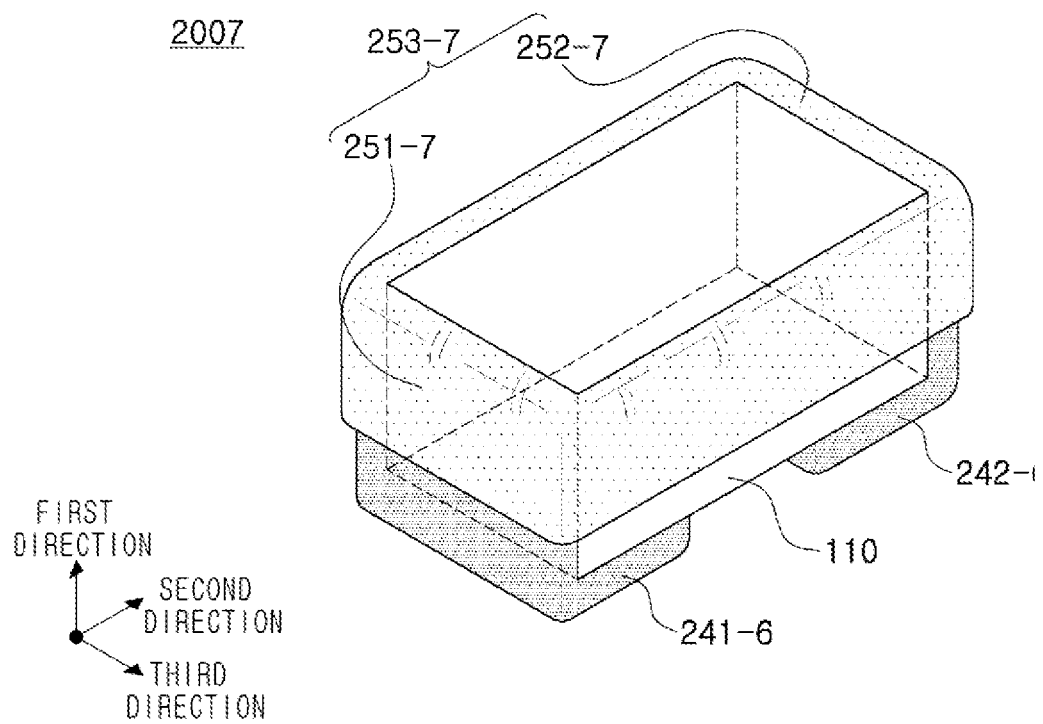
FIG. 30 is a view illustrating a modified example of FIG. 28.

FIG. 30 illustrates a modified example of FIG. 28, Referring: to FIG. 30, in a modified example 2007 of the multilayer electronic component 2006 according to an embodiment of the present disclosure, first and second insulating layers 251-7 and 252-7 may extend to the fifth and sixth surfaces 5 and 6 and be connected to each other to constitute a single insulating layer 253-7.

Figure 31:
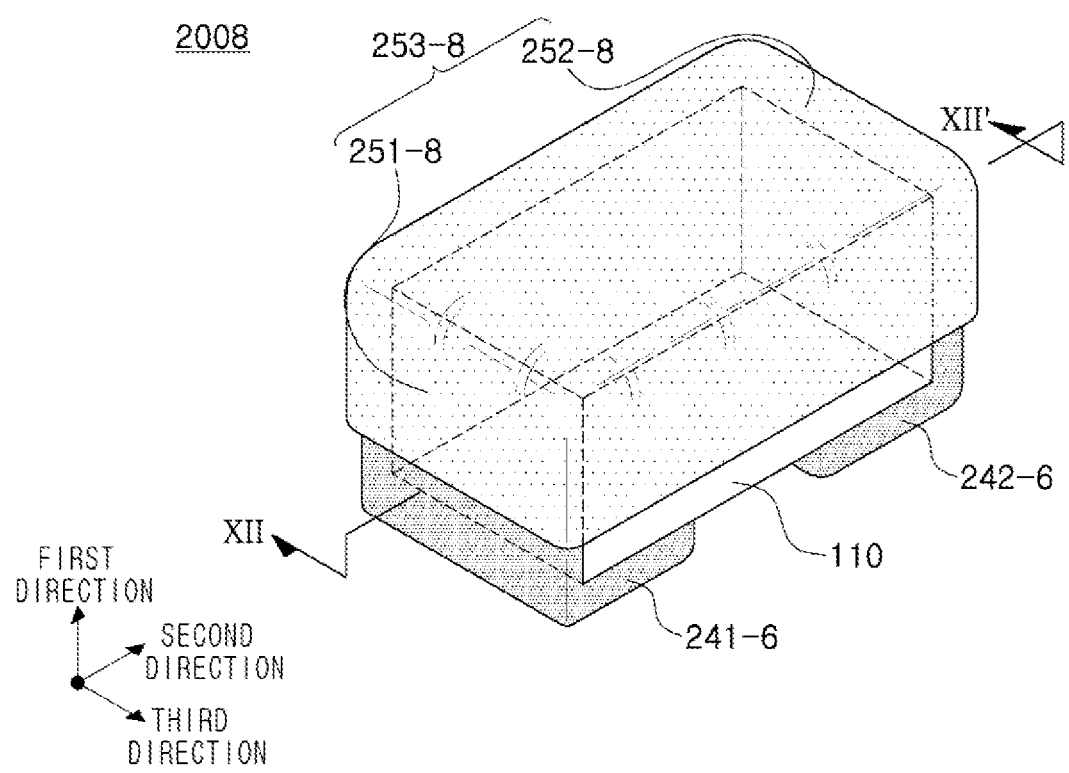
FIG. 31 is a schematic perspective view of a multilayer electronic component according to an embodiment of the present disclosure.
Figure 32:
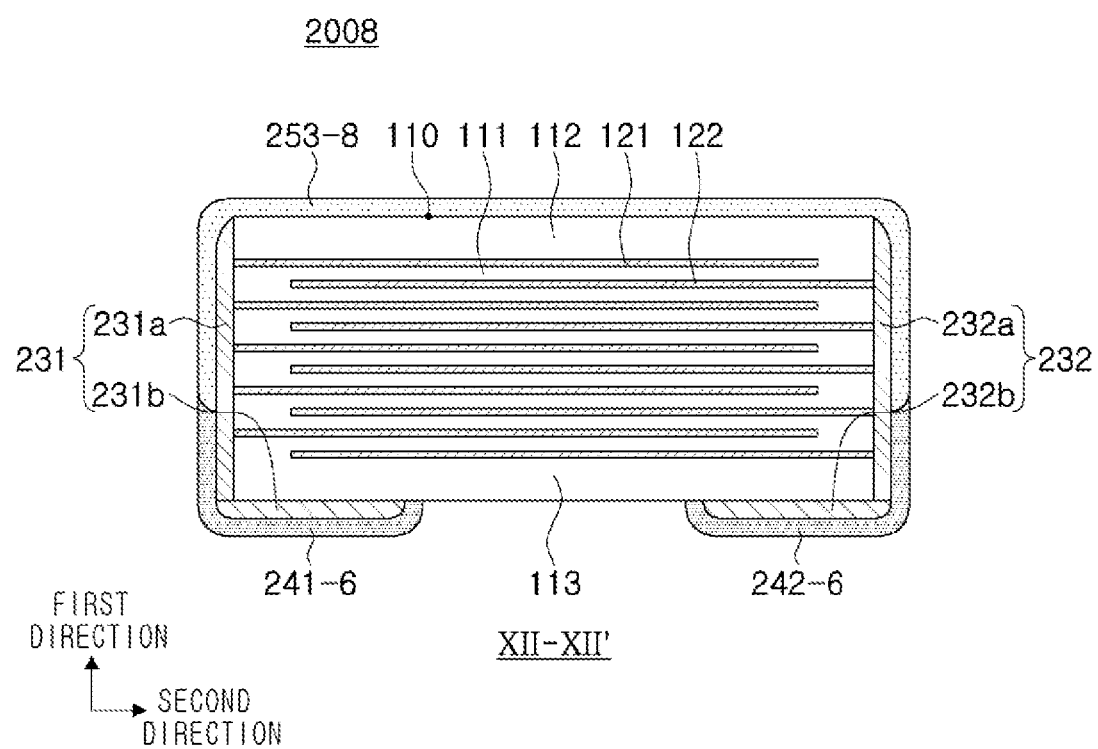
FIG. 32 is a cross-sectional view taken along line XII-XII' of FIG. 31.

FIG. 31 is a schematic perspective view of a multilayer electronic component 2008 according to an embodiment of the present disclosure. FIG. 32 is a cross-sectional view taken along line XII-XII' of FIG. 31.

Figure 33:
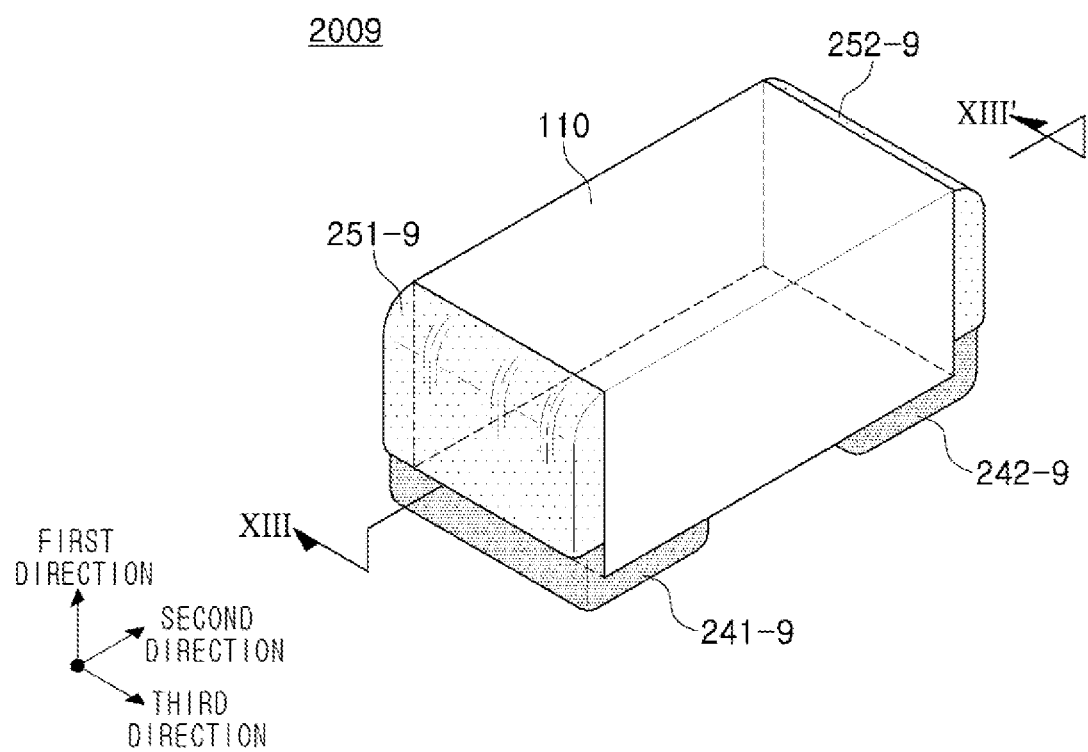
FIG. 33 is a schematic perspective view of a multilayer electronic component according to an embodiment of the present disclosure.

Referring to FIGS. 31 and 32, in the multilayer electronic component 2008 according to an embodiment may extend to second, fifth, and sixth surfaces 2, 5, and 6 to be connected to each other to constitute a single insulating layer 253-8. As illustrated in FIG. 33, the insulating layer 253-8 may have a form covering an entirety of the second surface and only portions of the fifth and sixth surfaces.

Figure 34:
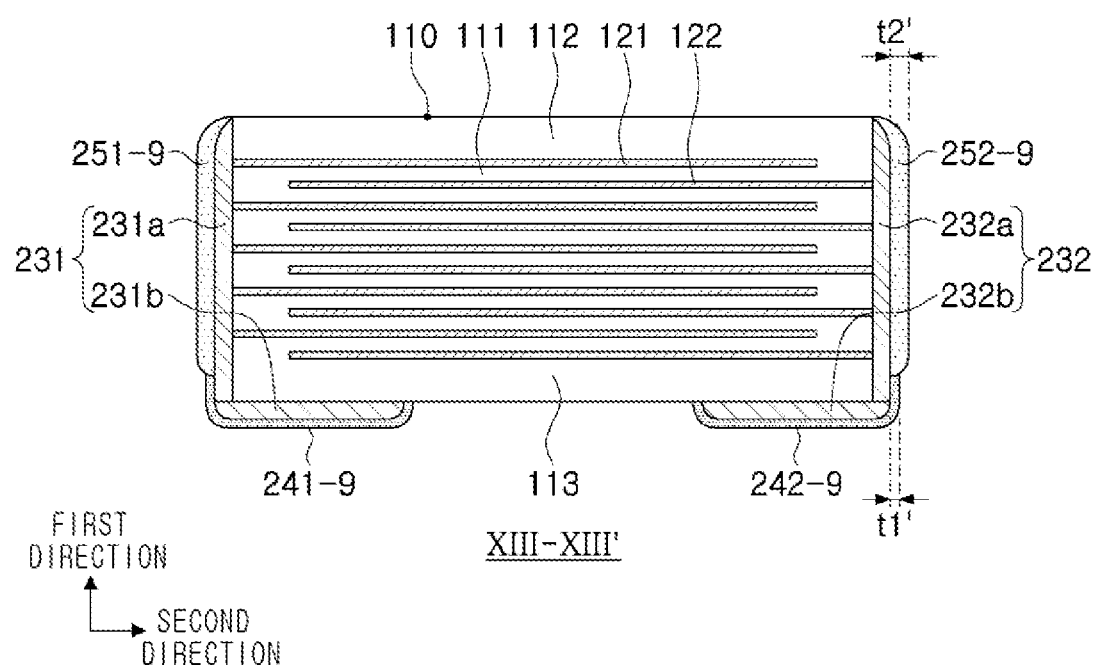
FIG. 34 is a cross-sectional view taken along line XIII-XIII' of FIG. 33.

FIG. 33 is a schematic perspective view of a multilayer electronic component 2009 according to an embodiment in the present disclosure. FIG. 34 is a cross-sectional view taken along line XIII-XIII' of FIG. 33.

Figure 35:
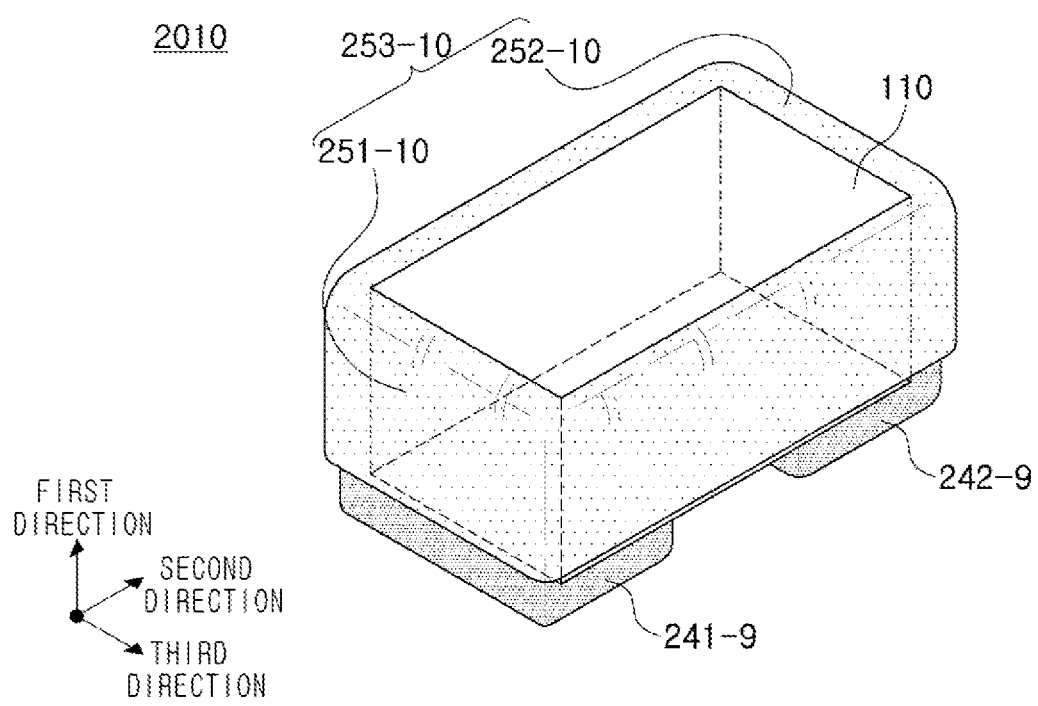
FIG. 35 is a view illustrating a modified embodiment of FIG. 33.
Figure 36:
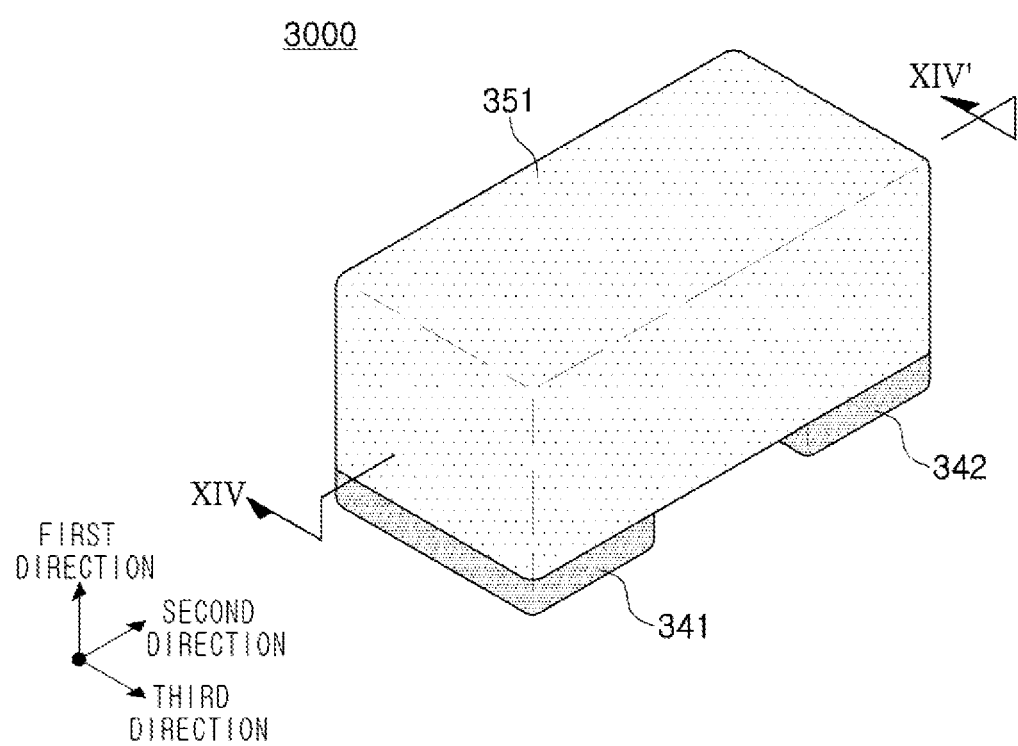
FIG. 36 is a schematic perspective view of a multilayer electronic component according to an embodiment of the present disclosure.

Referring to FIGS. 35 and 36, in the multilayer electronic component 2009 according to an exemplary embodiment, an average thickness "t1'" of first and second plating layers 241-9 and 242-9 may be smaller than an average thickness "t2'" of insulating layers 251-9 and 252-9.

According to an embodiment of the present disclosure, the average thickness "t1'" of first and second plating layers 241-9 and 242-9 may be smaller than an average thickness "t2'" of insulating layers 251-9 and 252-9, so that a contact area between a plating layer and an insulating layer may be decreased. Thus, occurrence of delamination may be suppressed to improve adhesion strength of the multilayer electronic component 2009 to a substrate 180.

The average thickness "t1'" of the first and second plating layers 241-9 and 242-9 may be an average value of thicknesses measured at five points at equal intervals on the first and second connection electrodes 231a and 232a or the first and second band electrodes 231b and 232b, and the average thickness "t2'" of the insulating layers 251-9 and 252-9 may be an average value of thicknesses measured at five points at equal intervals on the first and second connection electrodes 231a and 232a.

FIG. 35 is a view illustrating a modified embodiment 2010 of FIG. 33. Referring to FIG. 35, in a modified example 2010 of the multilayer electronic component 2009 according to an embodiment, first and second insulating layers 251-10 and 252-10 may extend to fifth and sixth surfaces 5 and 6 to be connected to each other to constitute a single insulating layer 253-10.

Figure 37:
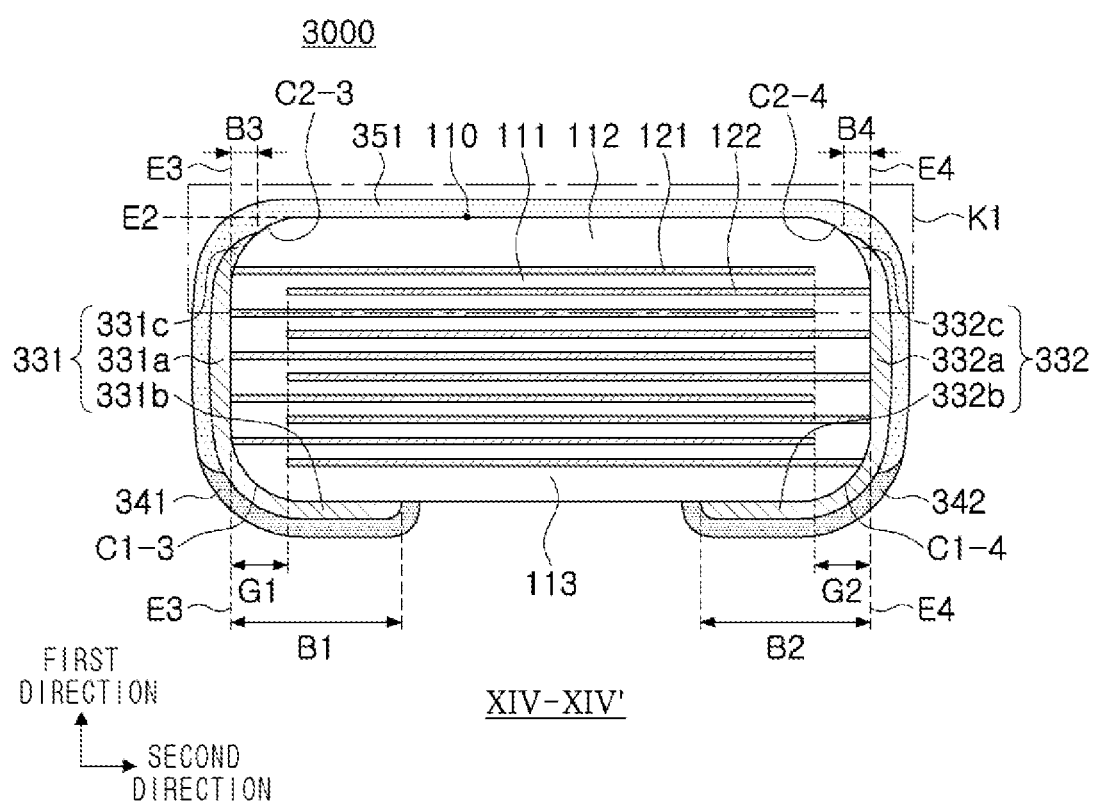
FIG. 37 is a cross-sectional view taken along line XIV-XIV' of FIG. 36.
Figure 38:
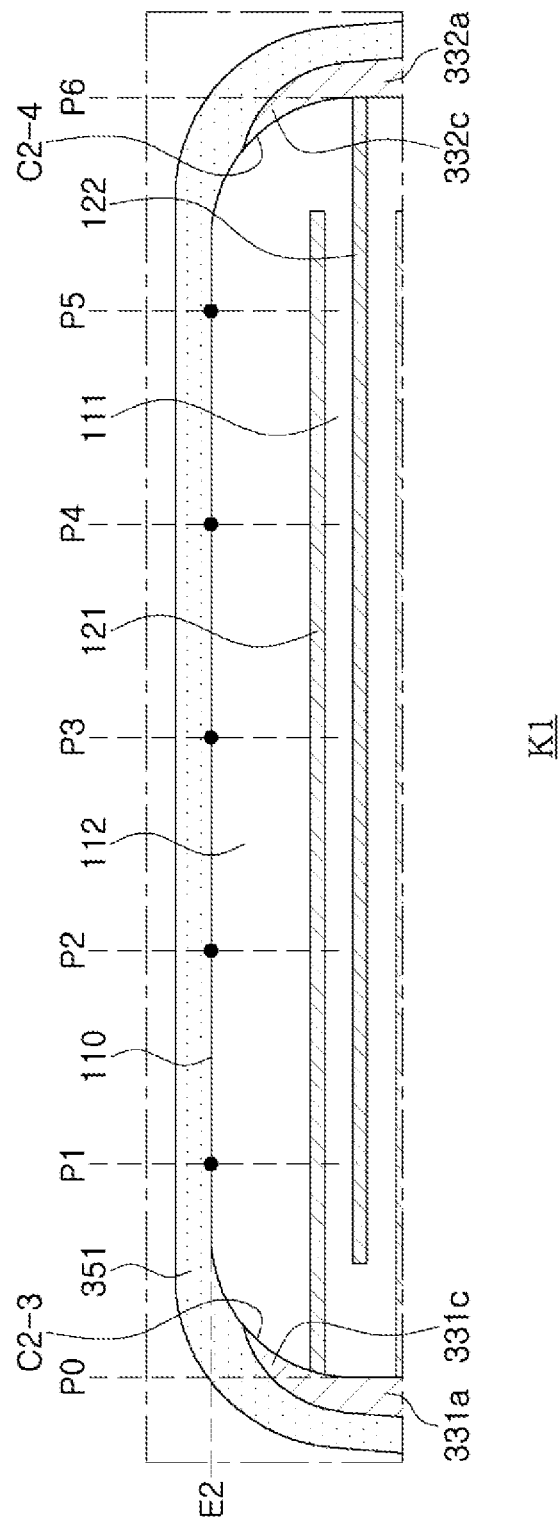
FIG. 38 is an enlarged view of region K1 of FIG. 36.

FIG. 36 is a schematic diagram illustrating a perspective view of a multilayer electronic component 3000 according to an embodiment of the present disclosure. FIG. 37 is a cross-sectional view taken along line XIV-XIV' of FIG. 36. FIG. 38 is an enlarged view of region K1 of FIG. 36.

Referring to FIGS. 36 to 38, the multilayer electronic component 3000 according to an embodiment may include a body 110 including a dielectric layer 111 and first and second internal electrodes 121 and 122 alternately disposed with the dielectric layer 111 interposed therebetween, the body 110 having first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction; a first external electrode 331 including a first connection portion 331a disposed on the third surface 3 of the body, a first band portion 331b extending from the first connection portion 331a onto a portion of the first surface 1, and a first corner portion 331c disposed to extend from the first connection portion 331a to a corner connecting the second and third surfaces 2 and 3 of the body; a second external electrode 331 including a second connection portion 332a disposed on the fourth surface of the body 4, a second band portion 332b extending from the second connection portion 332a onto a portion of the first surface 1, and a second corner portion 332c disposed to extend from the second connection portion 332a to a corner connecting the second and fourth surfaces 2 and 4 of the body; an insulating layer 351 disposed on the first and second connection portions 331a and 332a, and disposed to cover the second surface 2, and the first and second corner portions 331c and 332c; a first plating layer 341 disposed on the first band portion 331b; and a second plating layer 342 disposed on the second band portion 332b. The insulating layer 351 may include an oxide containing Ti, and the dielectric layer may include at least one of $BaTiO_3$, $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) and $Ba(Ti_{1-y}Zr_y)O_3$ (0<y<1) as a main component.

In an embodiment, when an average size from an extension line E3 of the third surface 3 to an end of the first corner portion 331c in the second direction is B3, an average size from an extension line E4 of the fourth surface 4 to an end of the second corner portion 332c in the second direction is B4, an average size of a region, in which the third surface 3 and the second internal electrode 122 are spaced apart from each other in a second direction is G1, and an average size of a region, in which the fourth surface 4 and the first internal electrode 121 are spaced apart from each other in a second direction is G2, B3≤G1 and B4 G2 may be satisfied. Accordingly, a volume occupied by the external electrodes 331 and 332 may be significantly reduced to increase capacitance per unit volume of the multilayer electronic component 3000.

In this case, when an average size from the extension line E3 of the third surface 3 to an end of the first band portion 331b in the second direction is B1, an average size from the extension line E4 of the fourth surface 4 to an end of the second band portion 332b in the second direction is B2, B1≥G1 and B2≥G2 may be satisfied. Accordingly, an area in contact with a solder during mounting may be increased to improve adhesion strength.

The multilayer electronic component 3000 according to an embodiment may include a body 110 including a dielectric layer 111 and first and second internal electrodes 121 and 122 alternately disposed with the dielectric layer 111 interposed therebetween, the body 110 having first and second surfaces 1 and 2 opposing each other in a first direction, third and fourth surfaces 3 and 4 connected to the first and second surfaces 1 and 2 and opposed each other in a second direction, and fifth and sixth surfaces 5 and 6 connected to the first to fourth surfaces 1 to 4 and opposing each other in a third direction. The body 110 of the multilayer electronic component 3000 may have the same configuration as the body 110 of the multilayer electronic component 1000, except that an end portion of the first or second surface 1 or 2 of the body has a contracted shape, as will be described later.

The external electrodes 331 and 332 may be disposed on the third surface 3 and the fourth surface 4 of the body 110. The external electrodes 331 and 332 may include first and second external electrodes 331 and 332, respectively disposed on the third and fourth surfaces 3 and 4 of the body 110 to be connected to the first and second internal electrodes 121 and 122.

The external electrodes 331 and 332 may include a first external electrode 331, including a first connection portion 331a disposed on the third surface 3, a first band portion 331b extending from the first connection portion 331a onto a portion of the first surface 1, and a first corner portion 331c disposed to extend from the first connection portion 331a to a corner connecting the second and third surfaces 2 and 3, and a second external electrode 332 including a second connection portion 332a disposed on the fourth surface 4, a second band portion 332b extending from the second connection portion 332a onto a portion of the first surface 1, and a second corner portion 332c disposed to extend from the second connection portion 332a to a corner connecting the second and fourth surfaces 2 and 4. The first connection portion 331a may be connected to the first internal electrode 121 on the third surface 3, and the second connection portion 332a may be connected to the second internal electrode 122 on the fourth surface 4.

In an embodiment, the first and second connection portions 331a and 332a may be disposed to be spaced from the fifth and sixth surfaces 5 and 6. Accordingly, a volume occupied by the external electrodes 331 and 332 may be significantly reduced, so that the multilayer electronic component 3000 may be further miniaturized.

As a margin region, in which the internal electrodes 121 and 122 are not disposed, overlaps the dielectric layer 111, a step may be formed due to a thickness of each of the internal electrodes 121 and 122. Therefore, a corner connecting the first surface to the third to fifth surfaces and/or a corner connecting the second surface to the third to fifth surfaces may have a form contracted toward a center of the body 110 in the first direction, when viewed with respect to the first surface or the second surface. Alternatively, a corner connecting the first surface 1 to the third to sixth surfaces 3, 4, 5, and 6 and/or a corner connecting the second surface 2 to the third to sixth surfaces 3, 4, 5, and 6 may have a form contracted toward the center of the body 110 in the first direction by a shrinkage behavior in a process of sintering the body 110, when viewed with respect to the first surface 1 or the second surface 2. Alternatively, as a corner connecting the respective surfaces of the body 110 is rounded by an additional process to prevent a chipping defect, or the like, a corner connecting the first surface 1 to the third to sixth surfaces 3, 4, 5, and 6 and/or a corner connecting the second surface 2 to the third to sixth surfaces 3, 4, 5, and 6 may have a rounded form.

The corner may include a 1-3 corner C1-3 connecting the first and third surfaces, a 1-4 corner C1-4 connecting the first and fourth surfaces, a 2-3 corner C2-3 connecting the second and third surfaces, and a 2-4 corner C2-4 connecting the second and fourth surfaces. Also, the corner may include a 1-5 corner connecting the first and fifth surfaces, a 1-6 corner connecting the first and sixth surfaces, a 2-5 corner connecting the second and fifth surfaces, and a 2-6 corner connecting the second and sixth surfaces. However, to suppress a step formed by the internal electrodes 121 and 122, after lamination, the internal electrodes may be cut to be exposed to the fifth and sixth surfaces 5 and 6 of the body 110, and then a single dielectric layer or two or more dielectric layers are laminated on both side surfaces of a capacitance formation portion Ac in a third direction (a width direction) to form margin portions 114 and 115. In this case, a portion connecting the first surface 1 to the fifth and sixth surfaces 5 and 6 and a portion connecting the second surface 2 to the fifth and sixth surfaces 5 and 6 may not have a contracted form.

Meanwhile, the first to sixth surfaces of the body 110 may be overall planar surfaces, and non-planar regions may be considered to be corners. In addition, a region, disposed on a corner, of the external electrodes 131 and 132, may be considered to be a corner portion.

In this regard, the first and second corner portions 331c and 332c may be disposed on a level the same as or lower than a level of an extension line E2 of the second surface 2, and the first and second corner portions 331c and 332c may be disposed to be spaced apart from the second surface 2. That is, the external electrodes 331 and 332 are not disposed on the second surface 2, so that a volume occupied by the external electrodes 331 and 332 may be further significantly reduced to further increase capacitance per unit volume of the multilayer electronic component 3000. In addition, the first corner portion 331c may be disposed on a portion of the 2-3 corner C2-3 connecting the third and second surfaces 2, and the second corner portion 332c may be disposed on a portion of the 2-4 corner C2-4 connecting the fourth and second surfaces.

The extension line E2 of the second surface may be defined as follows.

In cross-sections of the multilayer electronic component 3000 taken in length-thickness directions from a center thereof in a width direction (L-T cross-sections), seven straight lines P0, P1, P2, P3, P4, P5, P6, and P7 having a uniform thickness from the third surface 3 to the fourth surface 4 in a length direction may be drawn, and a straight line passing through a point, at which the straight line P2 and the second surface 2 meet, and a point, at which the straight line P4 and the second surface 2 meet, may be defined as the extension line E2 of the second surface 2.

Meanwhile, the external electrodes 331 and 332 may be formed of any material having electrical conductivity, such as a metal, and a specific material of each of the external electrodes 131 and 132 may be determined in consideration of electrical characteristics, structural stability, and the like. Furthermore, the external electrodes 331 and 332 may have a multilayer structure.

The external electrodes 331 and 332 may be sintered electrodes including a conductive metal and glass, or may be resin-based electrodes including a conductive metal and a resin.

In addition, the electrode layers 331 and 332 may have a form in which sintered electrodes and resin-based electrodes are sequentially formed on the body. In addition, the electrode layers 331 and 332 may be formed by a method of transferring a sheet including a conductive metal to the body or be formed by a method of transferring a sheet including a conductive metal to a sintered electrode.

As the conductive metal included in the external electrodes 331 and 332, a material having improved electrical conductivity may be used and is not limited. For example, the conductive metal may be at least one of copper (Cu), nickel (Ni), palladium (Pd), silver (Ag), tin (Sn), chromium (Cr), and alloys thereof. The external electrodes 331 and 332 may include at least one of, in detail, Ni and a Ni alloy. Accordingly, connectivity to the internal electrodes 121 and 122 including Ni may be further improved.

The insulating layer 351 may be disposed on first and second connection portions 331a and 332a.

Since the first and second connection portions 331a and 332a are portions connected to the internal electrodes 121 and 122, they may be a path for permeation of a plating solution in a plating process or permeation of moisture during actual use. In an embodiment of the present disclosure, since the insulating layer 351 is disposed on the first and second connection portions 331a and 332a, permeation of external moisture or permeation of the plating solution may be prevented.

The insulating layer 351 may be disposed to be in contact with the first and second plating layers 341 and 342. In this case, when the insulating layer 351 may be in contact to have a form to partially cover ends of the first and second plating layers 341 and 342, and the first and second plating layers 341 and 342 may be in contact to have a form to partially cover an end of the insulating layer 351.

The insulating layer 351 may be disposed on the first and second connection portions 331a and 332a, and may be disposed to cover the second surface and the first and second corner portions 331c and 332c. In addition, the insulating layer 351 may cover a region, in which the ends of the first and second corner portions 331c and 332c are in contact with the body 110, to block a moisture permeation path, resulting in further improved moisture resistance reliability.

The insulating layer 351 may be disposed on the second surface to extend to the first and second connection portions 331a and 332a. Also, the insulating layer 351 may be disposed to cover an entirety of the second surface when the external electrodes 331 and 332 are not disposed on the second surface. Meanwhile, the insulating layer 351 does not need to be disposed on the second surface 2, and may not be disposed on a portion or an entirety of the second surface 2 or may be divided into two insulating layers, respectively disposed on the first and second connection portions 331a and 332a. However, even in this case, the insulating layer 351 may be disposed to cover the entirety of the first and second corner portions 331c and 332c. When the insulating layer 351 is not disposed on the entire second surface, the insulating layer 351 may be disposed on a level the same as or lower than a level of an extension line of the second surface. In addition, although the insulating layer 351 is not disposed on the second surface 2, the insulating layer 351 may extend to the fifth and sixth surfaces 5 and 6 on the first and second connection portions 331a and 332a to constitute a single insulating layer.

In an embodiment, the insulating layer 351 may be disposed to cover a portion of the fifth and sixth surfaces 5 and 6 to improve reliability. In this case, portions, which are not covered with the insulating layer 351, of the fifth and sixth surfaces 5 and 6 may be exposed externally.

Furthermore, the insulating layer 351 may be disposed to cover the entirety of the fifth and sixth surfaces 5 and 6. In this case, the fifth and sixth surfaces 5 and 6 may not be exposed externally, resulting in further improved moisture resistance reliability.

The insulating layer 351 may serve to prevent the plating layers 341 and 342 from being formed on the external electrodes 331 and 332 on which the insulating layer 351 is disposed, and may serve to improve sealing characteristics to significantly reduce permeation of external moisture or permeation of a plating solution. Components, a composition, an average thickness, and effects of the insulating layer 351 are the same as those of the insulating layers 151, 251, 252, and 253 included in the multilayer electronic components 1000 and 2000 and various embodiments of the multilayer electronic components 1000 and 2000, and descriptions thereof will be omitted.

The first and second plating layers 341 and 342 may be disposed on the first and second band electrodes 331b and 332b. The first and second plating layers 341 and 342 may serve to improve mounting characteristics. As the plating layers 341 and 342 are disposed on the band portions 331b and 332b, a mounting space may be minimized, and permeation of a plating solution into the internal electrode may be minimized, thereby improving reliability. One ends of the first and second plating layers 341 and 342 may be in contact with the first surface, and the other ends may be in contact with the insulating layer 351.

The types of the plating layers 341 and 342 are not limited, and each of the plating layers 341 and 342 may be a plating layer including at least one of Ni, Sn, Pd, and alloys thereof, and may include a plurality of layers.

As a more specific example of the plating layers 341 and 342, the plating layers 341 and 342 may be a Ni plating layer or a Sn plating layer, and may have a form in which a Ni plating layer and a Sn plating layer are sequentially formed on the first and second band electrodes 331b and 332b.

In an embodiment, the insulating layer 351 may be disposed to be in direct contact with the first and second external electrodes 331 and 332, and the first and second external electrodes 331 and 332 may include a conductive metal and glass. Accordingly, the plating layers 341 and 342 may not be disposed in a region, in which the insulating layer 351 is disposed, of the external surfaces of the first and second external electrodes 331 and 332, so that the erosion of external electrodes caused by a plating solution may be effectively suppressed.

In an embodiment, the first plating layer 341 may be disposed to cover an end disposed on the first external electrode 331 of the insulating layer 351, and the second plating layer 342 may be disposed to cover an end disposed on the second external electrode 332 of the insulating layer 351. Accordingly, bonding strength between the insulating layer 351 and the plating layers 341 and 342 may be increased to improve reliability of the multilayer electronic component 3000. In addition, by forming the insulating layer 351 before forming the plating layers 341 and 342 on the external electrodes 331 and 332, the permeation of the plating solution during formation of the plating layer may be more reliably suppressed. As the insulating layer is formed before forming the plating layer, the plating layers 341 and 342 may have a form covering an end of the insulating layer 351.

In an embodiment, the insulating layer 351 may be disposed to cover an end disposed on the first external electrode 331 of the first plating layer 341, and may be disposed to cover an end disposed on the second external electrode 332 of the second plating layer 342. Accordingly, the bonding strength between the insulating layer 351 and the plating layers 341 and 342 may be increased to improve the reliability of the multilayer electronic component 3000.

In an embodiment, the first and second plating layers 341 and 342 may disposed to extend to partially cover the first and second connection portions 331a and 332a, respectively. In the present embodiment, when an average size to an internal electrode, disposed to be closest to a first surface 1, among the first and second internal electrodes 121 and 122 in a first direction is H1, and an average size from an extension line E1 of the first surface 1 to ends of the first and second plating layers 341 and 342 disposed on the first and second connection portions 131a and 132a in the first direction is H2, H1>H2 (or H1≥H2) may be satisfied. Accordingly, the permeation of the plating solution into the internal electrode during the plating process may be suppressed to improve reliability.

In an embodiment, when an average size from the first surface to an internal electrode, disposed to be closest to the first surface, among the first and second internal electrodes 121 and 122 in a first direction is H1, an average size from an extension line E1 of the first surface 1 to ends of plating layers 341 and 342 disposed on the first and second connection portions 331a and 332a in a first direction is H2, H1<H2 may be satisfied. Accordingly, an area in contact with a solder during mounting may be increased to improve adhesion strength. More preferably, when an average size of the body 110 in the first direction is T, H2<T/2 may be satisfied. That is, H1<H2<T/2 may be satisfied. This is because when "H2" is greater than or equal to T/2, an effect of improving moisture resistance reliability by an insulating layer may be decreased.

In an embodiment, the first and second plating layers 341 and 342 may be disposed on a level the same as or lower than a level of an extension line of the first surface. Accordingly, a height of a solder during mounting may be minimized, and a mounting space thereof may be significantly reduced. In addition, the insulating layer 351 may extend to a on a level the same as or lower than a level of the extension line of the first surface and be disposed to be in contact with the first and second plating layers 341 and 342.

In an embodiment, when an average size of the body in a second direction is L, an average size from an extension line E3 of the third surface 3 to an end of the first band portion 331b in the second direction is B1, and an average size from an extension line E4 of the fourth surface 4 to an end of the second band portion 332b in the second direction is B2, 0.2≤B1/L≤0.4 and 0.2≤B2/L≤0.4 may be satisfied.

When B1/L and B2/L are less than 0.2, it may be difficult to secure sufficient adhesion strength. On the other hand, when B2/L exceeds 0.4, leakage current may be generated between the first band portion 331b and the second band portion 332b under a high-voltage current, and the first band portion 331b and the second band portion 332b may be electrically connected to each other by plating spreading, or the like, during a plating process.

In an embodiment, the multilayer electronic component according to an embodiment may further include an additional insulating layer disposed on the first surface and disposed between the first band portion 331b and the second band portion 331b. Accordingly, it is possible to prevent leakage current, or the like, that may occur between the first band electrode 331b and the second band electrode 332b under a high-voltage current.

The type of the additional insulating layer does not need to be limited. For example, the additional insulating layer may include glass or a polymer resin. For example, the polymer resin may include at least one selected from the group consisting of an epoxy resin, an acrylic resin, ethyl cellulose, and the like, or may include glass.

In an embodiment, when the additional insulating layer includes a polymer resin, the additional insulating layer may include at least one selected from $TiO_2$, $BaTiO_3$, $Al_2O_3$, $SiO_2$, BaO, and the like, as an additive in addition to a polymer resin. Accordingly, adhesion strength to a body or an external electrode may be improved.

In more detail, when an average size from an extension line E3 of the third surface 3 to an end of the first band portion 331b in the second direction is B1, an average size from an extension line E4 of the fourth surface 4 to an end of the second band portion 332b in the second direction is B2, an average size from the extension line E3 of the third surface 3 to an end of the first corner portion 331c in the second direction is B3, and an average size from the extension line E4 of the fourth surface 4 to an end of the second corner portion 332c in the second direction is B4, B3<B1 and B4<B2 may be satisfied.

In an embodiment, an average thickness of the first and second plating layers 341 and 342 may be smaller than an average thickness of the insulating layer 351.

The insulating layer 351 may serve to prevent permeation of external moisture or a plating solution, but may have weak connectivity to the plating layers 341 and 342 to cause delamination of the plating layers 341 and 342. When the plating layer is delaminated, adhesion strength to a substrate 180 may be reduced. The "delamination of a plating layer" may mean that a plating layer is partially removed or is physically separated from the external electrodes 331 and 332. Since connectivity between a plating layer and an insulating layer is weak, there is high possibility that a gap at an interface between the insulating layer and the plating layer may be increased or foreign objects may permeate through the gap, and there is high possibility that the plating layer may be delaminated due to vulnerability to external impact, or the like.

According to an embodiment, the plating layer may be formed to have the average thickness of the plating layer thinner than the average thickness of the insulating layer, so that a contact area between the plating layer and the insulating layer may be reduced. Thus, occurrence of delamination may be suppressed to improve adhesion strength to the multilayer electronic component 3000.

A size of the multilayer electronic component 3000 does not need to be particularly limited.

However, to achieve both miniaturization and high capacitance, the number of laminated layers should be increased by thinning a dielectric layer and internal electrodes. An effect of improving reliability and capacitance per unit volume according to the present disclosure may become more remarkable in the multilayer electronic component 3000 having a size of 1005 (length×width, 1.0 mm×0.5 mm) or less.

Accordingly, when the multilayer electronic component 3000 has a length of 1.1 mm or less and a width of 0.55 mm or less in consideration of a manufacturing error and a size of an external electrode, a reliability improvement effect according to the present disclosure may be more remarkable. The length of the multilayer electronic component 3000 may refer to a size of the multilayer electronic component 3000 in the second direction, and the width of the multilayer electronic component 3000 may refer to a size of the multilayer electronic component 3000 in the third direction.

As set forth above, according to one of the various effects of the present disclosure, by disposing an insulating layer on a connection portion of the external electrode, and a plating layer on a band portion of the external electrode, reliability of the multilayer electronic component may be improved while improving the capacitance per unit volume of the multilayer electronic component.

As one of the various effects of the present disclosure, a mounting space of the multilayer electronic component may be minimized.

As one of the various effects of the present disclosure, an insulating may include an oxide containing Ti, so that moisture resistance reliability may be improved and the occurrence and propagation of cracks may be suppressed.

As one of the various effects of the present disclosure, an insulating layer includes an oxide containing Ti, a dielectric layer includes one of $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) and $Ba(Ti_{1-y}Zr_y)O_3$ ($0<y<1$) as a main component, so that adhesion between the insulating layer and the body is improved.

While example embodiments have been shown and described above, it will be apparent to those skilled in the art that modifications and variations could be made without departing from the scope of the present invention as defined by the appended claims.

What is claimed is:
1. A multilayer electronic component, comprising:
a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, fifth and sixth surfaces connected to the first to fourth surfaces and opposing each other in a third direction;
a first external electrode including a first connection portion disposed on the third surface, and a first band portion extending from the first connection portion onto a first portion of the first surface;
a second external electrode including a second connection portion disposed on the fourth surface, and a second band portion extending from the second connection portion onto a second portion of the first surface;
an insulating layer including a first insulating layer disposed on the first connection portion and a second insulating layer disposed on the second connection portion; and
a plating layer including a first plating layer disposed on the first band portion and a second plating layer disposed on the second band portion,
wherein the insulating layer comprises an oxide containing Ti, and the dielectric layer comprises at least one of BaTiO3, (Ba1-xCax)TiO3 (0<x<1), Ba(Ti1-yCay)O3 (0<y<1), (Ba1-xCax)(Ti1-yZry)O3 (0<x<1, 0<y<1) and Ba(Ti1-yZry)O3 (0<y<1) as a main component,
wherein the insulating layer has an average thickness of 50 nm or more and 1000 nm or less, wherein a ratio of the number of moles of Ti element to the total number of moles of elements other than oxygen, among the elements constituting the insulating layer, is 0.95 or more.

2. The multilayer electronic component of claim 1, wherein the oxide containing Ti includes $TiO_2$.

3. The multilayer electronic component of claim 2, wherein the dielectric layer comprises $BaTiO_3$ as a main component.

4. The multilayer electronic component of claim 1, wherein the dielectric layer comprises $(Ba_{1-x}Ca_x)TiO_3$ ($0<x<1$) as a main component.

5. The multilayer electronic component of claim 1, wherein H1≥H2 is satisfied, in which H1 is an average distance from the first surface to an internal electrode closest to the first surface among the first and second internal electrodes in the first direction, and H2 is an average distance from an extension line of the first surface to ends of the first and second plating layers disposed on the first and second connection portions in the first direction.

6. The multilayer electronic component of claim 1, wherein H1<H2 is satisfied, in which H1 is an average distance from the first surface to an internal electrode closest to the first surface among the first and second internal electrodes in the first direction, and H2 is an average distance from an extension line of the first surface to ends of the first and second plating layers disposed on the first and second connection portions in the first direction.

7. The multilayer electronic component of claim 6, wherein H2<T/2, in which T is an average size of the body in the first direction.

8. The multilayer electronic component of claim 1, wherein the first and second plating layers are disposed below an extension line of the first surface.

9. The multilayer electronic component of claim 1, wherein 0.2≤B1/L≤0.4 and 0.2≤B2/L≤0.4 are satisfied, in which L is an average size of the body in the second direction, B1 is an average distance from an extension line of the third surface to an end of the first band portion in the second direction, and B2 is an average distance from an extension line of the fourth surface to an end of the second band portion in the second direction.

10. The multilayer electronic component of claim 1, further comprising an additional insulating layer disposed on the first surface and disposed between the first band portion and the second band portion.

11. The multilayer electronic component of claim 1, wherein an average thickness of the dielectric layer is 0.35 µm or less.

12. The multilayer electronic component of claim 1, wherein an average thickness of the first and second internal electrodes is 0.35 µm or less.

13. The multilayer electronic component of claim 1, wherein the body includes a capacitance formation portion including the first and second internal electrodes alternately disposed with the dielectric layer therebetween, and a cover portion disposed on both end surfaces of the capacitance formation portion in the first direction,
wherein an average size of the cover portion in the first direction is 15 µm or less.

14. The multilayer electronic component of claim 1, wherein an average thickness of the first and second plating layers is less than an average thickness of the insulating layer.

15. The multilayer electronic component of claim 1, wherein the first plating layer is disposed to cover an end of the first insulating layer close to the first surface, and the second plating layer is disposed to cover an end of the second insulating layer close to the first surface.

16. The multilayer electronic component of claim 1, wherein the first insulating layer is disposed to cover an end of the first plating layer disposed on the first external electrode, and the second insulating layer is disposed to cover an end of the second plating layer disposed on the second external electrode.

17. The multilayer electronic component of claim 1, wherein
the first external electrode includes a first side band portion extending from the first connection portion onto portions of the fifth and sixth surfaces,
the second external electrode includes a second side band portion extending from the second connection portion onto portions of the fifth and sixth surfaces, and
a size of each of the first and second side band portions in the second direction is increased in a direction toward the first surface.

18. The multilayer electronic component of claim 1, wherein
the first and second external electrodes are disposed to be spaced apart from the fifth and sixth surfaces.

19. The multilayer electronic component of claim 1, wherein
the first and second external electrodes are disposed to be spaced apart from the second surface.

20. The multilayer electronic component of claim 1, wherein
the first and second insulating layers extend to the second surface to be connected to each other.

21. The multilayer electronic component of claim 1, wherein
the first and second insulating layers extend to the fifth and sixth surfaces to be connected to each other.

22. The multilayer electronic component of claim 1, wherein
the first and second insulating layers are not disposed on the second, fifth and sixth surfaces.

23. The multilayer electronic component of claim 1, wherein
the first external electrode further includes a third band portion extending from the first connection portion onto a portion of the second surface, and
the second external electrode further includes a fourth band portion extending from the second connection portion onto a portion of the second surface.

24. The multilayer electronic component of claim 1, wherein
the body has a 1-3-th corner connecting the first and third surfaces to each other, a 1-4-th corner connecting the first and fourth surfaces to each other, a 2-3-th corner connecting the second and third surfaces, and a 2-4-th corner connecting the second and fourth surfaces to each other,
the 1-3-th corner and the 2-3-th corner have a form contracted to a center of the body in the first direction, in a direction toward the third surface, and the 1-4-th corner and the 2-4-th corner are contracted to the center of the body in the first direction, in a direction toward the fourth surface, and
the first external electrode includes a first corner portion disposed to extend from the first connection portion toward the first surface and over the 1-3-th corner and the 2-3-th corner, and the second external electrode includes a second corner portion disposed to extend from the second connection portion toward the first surface and over the 1-4-th corner and the 2-4-th corner.

25. The multilayer electronic component of claim 24, wherein $B3<G1$ and $B4\leq G2$, where B3 is an average distance from an extension line of the third surface to a distal end of the first corner portion in the second direction, B4 is an average distance from an extension line of the fourth surface to a distal end of the second corner portion in the second direction, G1 is an average size of a region, in which the third surface and the second internal electrode are spaced apart from each other, in the second direction, and G2 is an average size of a region, in which the fourth surface and the first internal electrode are spaced apart from each other, in the second direction.

26. The multilayer electronic component of claim 1, wherein the first external electrode further includes a third band portion disposed on the second surface to be connected to the first connection portion, and the second external electrode further includes a fourth band portion disposed on the second surface to be connected to the second connection portion.

* * * * *